(12) United States Patent
Iwauchi et al.

(10) Patent No.: US 7,444,052 B2
(45) Date of Patent: Oct. 28, 2008

(54) DISPLAY DEVICE

(75) Inventors: Kenichi Iwauchi, Matsudo (JP); Kei Tokui, Chiba (JP); Yukihisa Takeuchi, Aichi-pref. (JP); Tsutomu Nanataki, Toyoake (JP); Natsumi Shimogawa, Nagoya (JP); Isao Shikata, Kasugai (JP)

(73) Assignees: NGK Insulators, Ltd., Nagoya (JP); Sharp Kabushiki Kaisha, Osaka (JP)

( * ) Notice: Subject to any disclaimer, the term of this patent is extended or adjusted under 35 U.S.C. 154(b) by 225 days.

(21) Appl. No.: 11/083,358

(22) Filed: Mar. 17, 2005

(65) Prior Publication Data

US 2005/0232573 A1 Oct. 20, 2005

(30) Foreign Application Priority Data

Mar. 19, 2004 (JP) .............................. 2004-079798
Dec. 24, 2004 (JP) .............................. 2004-372739

(51) Int. Cl.
*G02B 6/04* (2006.01)
*G02B 26/00* (2006.01)

(52) U.S. Cl. ...................................... 385/120; 359/237
(58) Field of Classification Search ........................ None
See application file for complete search history.

(56) References Cited

U.S. PATENT DOCUMENTS

| 5,862,275 | A | 1/1999 | Takeuchi et al. |
| 6,650,455 | B2 * | 11/2003 | Miles .......................... 359/237 |
| 2001/0041489 | A1 | 11/2001 | Takeuchi et al. |
| 2002/0033909 | A1 | 3/2002 | Hiyama et al. |
| 2003/0026564 | A1 * | 2/2003 | Takeuchi et al. ............. 385/120 |

FOREIGN PATENT DOCUMENTS

| EP | 0 675 477 B1 | 11/1999 |
| JP | 07-287176 A1 | 10/1995 |
| JP | 09-325715 A1 | 12/1997 |
| JP | 10-078549 A1 | 3/1998 |
| JP | 11-202222 A1 | 7/1999 |
| JP | 2000-275604 A1 | 10/2000 |
| JP | 2001-324961 A1 | 11/2001 |
| JP | 2002-049037 A1 | 2/2002 |
| JP | 2004-152515 | 5/2004 |
| WO | 2004/114004 | 12/2004 |

* cited by examiner

*Primary Examiner*—Sung Pak
*Assistant Examiner*—Hoang Tran
(74) *Attorney, Agent, or Firm*—Burr & Brown

(57) ABSTRACT

A display device includes an illuminating device having an optical waveguide plate for introducing light thereinto, a drive assembly having a planar array of actuators disposed in facing relation to the optical waveguide plate, a displacement transmitter assembly disposed between the optical waveguide plate and the drive assembly, and a light scattering layer disposed on the displacement transmitter assembly. The actuators are selectively displaceable to bring the light scattering layer into and out of contact with the optical waveguide plate, for controlling light that leaks from the optical waveguide plate as emitted light. The display device also includes an optical modulator for modulating the emitted light from the illuminating device to display an image. The illuminating device has a light reflecting layer disposed on at least a portion of the displacement transmitter assembly that confronts the optical waveguide plate.

11 Claims, 29 Drawing Sheets

DISPLAY DEVICE

BACKGROUND OF THE INVENTION

1. Field of the Invention

The present invention relates to a display device for displaying an image by modulating light emitted from an optical waveguide plate.

2. Description of the Related Art

Cathode ray tubes (CRTs) are widely used as display devices for personal computers and television receivers. However, liquid crystal displays (LCDs) are rapidly finding widespread use because CRTs are larger in overall size and consume more electric power.

When an LCD displays moving images, it tends to cause an afterimage, also known as ghosting. This phenomenon occurs because the LCD displays images based on a hold-type display principle. The hold-type display principle is a display mode in which an image is displayed substantially continuously during the period of one frame. According to the hold-type display principle, when different images are displayed respectively in two successive frame periods, i.e., when a moving image is displayed, since the images are perceived as being displayed simultaneously in different positions at the instant between the frame periods, an afterimage effect occurs. On the other hand, a CRT displays images based on a non-hold-type (impulse-type) principle. According to the non-hold-type principle, the CRT emits light instantaneously in one frame, and no afterimage occurs since the viewer sees the emitted light instantaneously in each frame.

A process (first process) for improving an afterimage caused by the hold-type display principle will be described below with reference to FIG. 25 of the accompanying drawings. According to this first process, a shutter 1006 is disposed forwardly of a display device (liquid crystal) 1000, at a position closer to an observer 1002, or is disposed rearwardly of the display device 1000 at a position closer to a light source lamp 1004. The display device 1000 displays an image by modulating light from the light source lamp 1004 based on a drive signal from a drive circuit 1008. The shutter 1006 controls transmission of display light from the display device 1000 based on shutter control pulses from a pulse generating circuit 1010 (see, for example, Japanese Laid-Open Patent Publication No. 9-325715).

Specifically, the shutter 1006 turns the light from the light source lamp 1004 on and off, to show an image displayed by the display device 1000 to the observer 1002 only during a certain period of each frame, thus providing a pseudo-impulse display mode.

FIG. 26 of the accompanying drawings shows another process (second process), which does not use a shutter 1006, but wherein control pulses from a pulse generating circuit 1010 are supplied to a power supply 1012 for the light source lamp 1004. According to the second process, electric power supplied from the power supply 1012 to the light source lamp 1004 is turned on and off based on the control pulses to energize and de-energize the light source lamp 1004, thereby showing an image displayed by the display device 1000 to the observer 1002 only during a certain period of each frame. In this case, a pseudo-impulse display mode is also provided (see Japanese Laid-Open Patent Publication No. 9-325715). A lens 1014 serves to focus the image display light from the display device 1000 onto a screen 1016.

As shown in FIG. 27 of the accompanying drawings, there is still another process (third process) for a liquid crystal display device 1024 having an illuminating device 1022 disposed behind a liquid crystal display unit 1020. For preventing displayed moving images from being blurred, the illuminating device 1022 is divided into a plurality of areas (area Za, area Zb, and area Zc), and the illuminating device 1022 is controlled by an illumination driver 1026, to thereby cause the areas of the illuminating device 1022 to separately illuminate the liquid crystal display unit 1020.

The illuminating device 1022 has a light diffusion plate 1028 on an upper portion thereof, which is held in contact with the liquid crystal display unit 1020, and a plurality of lamps 1030 disposed beneath the light diffusion plate 1028. Light reflection plates 1032 are disposed beneath the respective lamps 1030.

The illumination driver 1026 controls energization and de-energization of the lamps 1030 in the three areas, i.e., area Za, area Zb, and area Zc, of the illuminating device 1022 based on a vertical synchronizing signal Sv and a horizontal synchronizing signal Sh from a liquid crystal controller 1034. For example, the illumination driver 1026 controls the lamps 1030 in the three areas of the illuminating device 1022 such that the lamps 1030 are energized after transmittance of the liquid crystal display unit 1020 has become saturated. According to this process, even when the liquid crystal display unit 1020 displays a moving image, by moving a still image at a speed of 10 degrees/second across the visual angle, the observer does not perceive any image blurring whatsoever (see, for example, Japanese Laid-Open Patent Publication No. 2000-275604).

According to yet another process (fourth process: see, Japanese Laid-Open Patent Publication No. 2000-275604), rather than energizing and de-energizing the lamps 1030, a liquid crystal shutter (not shown) is disposed between the lamps 1030 and the liquid crystal display unit 1020, for controlling absorption and transmission of light from the lamps 1030 to achieve an impulse-type display mode in each of plural areas over the liquid crystal display unit 1020, in a similar manner as the third process.

According to the third and fourth processes, since emissions of light from respective areas are successively shifted in synchronism with scanning of the liquid crystal display unit 1020, unlike the impulse-type display modes effected entirely over the display surface (as in the first and second processes), less strict limitations are imposed on the response and emission times of the liquid crystal, allowing the light source to be energized for a longer period of time without the need for increased light emission intensity.

Another process using an illuminating device is disclosed in Japanese Laid-Open Patent Publication No. 2002-49037, for example. As shown in FIG. 28 of the accompanying drawings, the disclosed illuminating device, generally denoted by 1040, has a pair of light guides 1042, 1044 made of acrylic resin, a pair of transparent electrodes 1046, 1048 disposed respectively on lower and upper surfaces of the light guides 1042, 1044, a polymer-dispersed liquid crystal layer 1050 sandwiched between the light guides 1042, 1044, an air layer 1052 disposed on the lower surface of the light guide 1044, a first reflecting plate 1054 disposed below the lower surface of the light guide 1044 with the air layer 1052 interposed therebetween, a light source 1056 disposed on side surfaces of the light guides 1042, 1044, a light source cover 1058 covering the light source 1056, and a second reflecting plate 1060 disposed on opposite side surfaces of the light guides 1042, 1044.

When a voltage of 30 V, for example, is applied to a portion of the polymer-dispersed liquid crystal layer 1050, that portion converts to a transmission phase 1062. When no voltage is applied to another portion of the polymer-dispersed liquid crystal layer 1050, that portion is brought into a diffusion phase 1064. When incident light 1066 from the light source 1056 is applied to the transmission phase 1062, it is not diffused, but propagated through the light guide 1042, and is fully reflected by an interface of the light guide 1042 and travels as reflected light 1068. The reflected light 1068 is fully reflected repeatedly and propagates through the light guides 1042, 1044. When the incident light enters the diffusion phase 1064, it is diffused into diffused light 1070 and 1072. The angle at which the diffused light 1070 (upwardly diffused light) is applied to the interface of the light guide 1042 is smaller than the critical angle, so that the diffused light 1070 is emitted upwardly out of the light guide 1042. The angle at which the diffused light 1072 (downwardly diffused light) is applied to the interface of the light guide 1044 is also smaller than the critical angle, so that the diffused light 1072 is emitted downwardly out of the light guide 1044. Light emitted out of the light guide 1044 is reflected by the first reflecting plate 1054 beneath the illuminating device 1040, enters the illuminating device 1040 again, and is emitted upwardly out of the light guide 1042. Therefore, such light is emitted out of the diffusion phase 1064 of the illuminating device 1040.

By thus controlling transmission and diffusion of light from the light source 1056 using the illuminating device 1040, an impulse display mode is achieved for each of plural areas of the displayed image. Emission of light from each area can thereby be controlled without requiring light absorption.

A display device has also been disclosed having an optical waveguide plate and a plurality of actuators, wherein leakage light from the optical waveguide plate is controlled by the actuators for each of plural areas of the display device (see, for example, Japanese Laid-Open Patent Publication No. 7-287176). As shown in FIG. 29 of the accompanying drawings, the disclosed display device, denoted by 1080, has a light source (not shown) disposed on an end face of an optical waveguide plate 1082, and actuators 1084 are disposed on a surface of the optical waveguide plate 1082 that is opposite to a display surface thereof. When the actuators 1084, or displacement transmitters 1086 connected to the respective actuators 1084, are brought into contact with the optical waveguide plate 1082, light 1088 propagated through the optical waveguide plate 1082 is selectively emitted out of the optical waveguide plate 1082. When the displacement transmitters 1086 connected to the respective actuators 1084 are kept out of contact with the optical waveguide plate 1082, light 1088 is propagated through the optical waveguide plate 1082 by way of total reflection. When one or more of the displacement transmitters 1086 are kept in contact with the optical waveguide plate 1082, light (leakage light) 1090 is emitted from a portion of the display surface of the optical waveguide plate 1082 that corresponds to the displacement transmitter or transmitters 1086 held in contact with the optical waveguide plate 1082. Therefore, light can be emitted from a desired area of the optical waveguide plate 1082 to display an image or the like on the display device 1080.

However, the conventional processes described above suffer the following problems: The display devices disclosed in Japanese Laid-Open Patent Publication No. 9-325715 and Japanese Laid-Open Patent Publication No. 2000-275604 either employ the shutter, or energize and de-energize the light source to achieve an impulse display mode. However, when the shutter turns on and off light, then since the shutter turns off light by blocking it, the efficiency at which the light is utilized tends to be low. Stated otherwise, luminance is lowered, and electric power consumption is increased if luminance is desired to be kept at a constant level. If the light source is energized and de-energized to control the light, then the service life of the light source of the display device, which comprises a cold cathode-ray tube, is shortened. Furthermore, since a light source needs to be provided in association with each area to be turned on and off, the display device is costly to manufacture and large in size. In addition, the light source is utilized with poor efficiency, because it is not used for areas where light is turned off.

The display device disclosed in Japanese Laid-Open Patent Publication No. 2002-49037 does not require a shutter for blocking light and, with its light source turned on at all times, can turn on and off light for each area. The disclosed display device employs a liquid crystal for transmitting and diffusing light. During the transmission phase, in areas where light is guided through the optical waveguide plates by way of total reflection (areas from which no light is emitted), light is transmitted through the liquid crystal. However, since the liquid crystal does not highly transmit light, it tends to cause a loss of light. Although light is transmitted only once or twice through the liquid crystal and loss of light is small, light is fully reflected repeatedly through the optical waveguide plates and thus passes many times through the liquid crystal layer. Since loss of light is commensurate with the number of times that light passes through the liquid crystal layer, light is not used with high efficiency.

Similarly, the display device disclosed in Japanese Laid-Open Patent Publication No. 7-287176 does not require a shutter for blocking light and, with its light source turned on at all times, can turn on and off the light for each area. The disclosed display device is designed to utilize only light that is not fully reflected in the optical waveguide plate, and which is directly applied to the displacement transmitters, and thus, the display device does not effectively utilize light applied to other regions or to the displacement transmitters. In particular, optical components cannot be added to the display surface of the optical waveguide plate, and the disclosed display device does not have the advantages provided by optical components and cannot effectively utilize light.

SUMMARY OF THE INVENTION

It is an object of the present invention to provide a display device, which is capable of performing a hold-type display mode as a pseudo-impulse display mode for improved display characteristics for moving images, and of increasing the efficiency at which light is utilized.

According to the present invention, there is provided a display device comprising an illuminating device having an optical waveguide plate for introducing light thereinto, a drive assembly having a planar array of actuators disposed in facing relation to the optical waveguide plate, a displacement transmitter assembly disposed between the optical waveguide plate and the drive assembly, and a light scattering layer disposed on the displacement transmitter assembly, wherein the actuators are selectively displaceable to bring the light scattering layer into and out of contact with the optical waveguide plate, for controlling light that leaks from the optical waveguide plate as emitted light, and an optical modulator for modulating the emitted light from the illuminating device to display an image, wherein the illuminating device includes a light reflecting layer disposed on an upper portion of the drive assembly which confronts the optical waveguide plate.

The term "an upper portion of the drive assembly" is used to cover an upper portion (including a part of an upper portion) of the displacement transmitter assembly and an upper portion (including a part of an upper portion) of the drive assembly.

When the drive assembly displaces the actuators, the light scattering layer is brought into contact with the optical waveguide plate to emit light from a principal surface (light emission surface) of the optical waveguide plate. Since the light reflecting layer is disposed on the upper portion of the drive assembly, which confronts the optical waveguide plate, light can efficiently be emitted from the principal surface of the optical waveguide plate.

The actuators are selectively displaceable to bring a portion of the light scattering layer into and out of contact with the optical waveguide plate, allowing light to be emitted from a portion of the principal surface of the optical waveguide plate. Selective displacement of the actuators is controlled in periodic cycles to shift light emission areas successively stepwise.

If the optical modulator operates based on a hold-type display principle, the display device according to the present invention can display moving images in a pseudo-impulse display mode, providing improved moving image display characteristics and increased light utilization efficiency.

According to the present invention, there is also provided a display device comprising an illuminating device comprising an optical waveguide plate for introducing light thereinto, a drive assembly having a planar array of actuators disposed in facing relation to the optical waveguide plate, a displacement transmitter assembly disposed between the optical waveguide plate and the drive assembly, and a light scattering layer disposed on the displacement transmitter assembly, wherein the actuators are selectively displaceable to bring the light scattering layer into and out of contact with the optical waveguide plate, for controlling light that leaks from the optical waveguide plate as emitted light, and an optical modulator for modulating the emitted light from the illuminating device to display an image, wherein the illuminating device includes a light reflecting layer disposed on at least a portion of the displacement transmitter assembly which confronts the optical waveguide plate.

With the above arrangement, light can efficiently be emitted from a principal surface of the optical waveguide plate. If the optical modulator operates based on a hold-type display principle, the display device according to the present invention can display moving images in a pseudo-impulse display mode for improved moving image display characteristics and increased light utilization efficiency.

The light scattering layer, which is disposed on the displacement transmitter assembly, may be disposed on the light reflecting layer that is disposed on at least the portion of the displacement transmitter assembly which confronts the optical waveguide plate. The illuminating device may be made lower in profile if the thickness of the light scattering layer is reduced. However, reducing the thickness of the light scattering layer may allow light applied thereto to pass through the light scattering layer, preventing light from being emitted from the illuminating device. When the light reflecting layer is disposed beneath the light scattering layer, light that has passed through the light scattering layer is reflected, thereby reducing a reduction in luminance which may be caused by the reduced thickness of the light scattering layer.

According to the present invention, there is also provided a display device comprising an illuminating device comprising an optical waveguide plate for introducing light thereinto, a drive assembly having a planar array of actuators disposed in facing relation to the optical waveguide plate, a displacement transmitter assembly disposed between the optical waveguide plate and the drive assembly, and a light scattering layer disposed on the displacement transmitter assembly, wherein the actuators are selectively displaceable to bring the light scattering layer into and out of contact with the optical waveguide plate, for controlling light that leaks from the optical waveguide plate as emitted light, and an optical modulator for modulating the emitted light from the illuminating device to display an image, wherein the illuminating device includes a light reflecting layer disposed on at least a portion of the drive assembly which confronts the optical waveguide plate. The light reflecting layer can reflect stray light introduced into the drive assembly, forwardly of the optical waveguide plate.

With the above arrangement, the display device may further comprise a light reflecting layer disposed on at least a portion of the displacement transmitter assembly which confronts the optical waveguide plate, and the light scattering layer, which is disposed on the displacement transmitter assembly, may be disposed on the light reflecting layer that is disposed on at least the portion of the displacement transmitter assembly which confronts the optical waveguide plate.

According to the present invention, there is also provided a display device comprising an illuminating device comprising an optical waveguide plate for introducing light thereinto, a drive assembly having a planar array of actuators disposed in facing relation to the optical waveguide plate, a displacement transmitter assembly disposed between the optical waveguide plate and the drive assembly, and a light scattering layer disposed on the displacement transmitter assembly, wherein the actuators are selectively displaceable to bring the light scattering layer into and out of contact with the optical waveguide plate, for controlling light that leaks from the optical waveguide plate as emitted light, and an optical modulator for modulating the emitted light from the illuminating device to display an image, wherein the illuminating device includes a spacer disposed between the drive assembly and the optical waveguide plate, and a light reflecting layer disposed on at least a portion of the spacer which confronts the optical waveguide plate.

Since no leaking light is emitted from a portion of the optical waveguide plate which is not contacted by the light scattering layer, light introduced into the light scattering layer can be scattered by the light reflecting layer on the spacer, thus preventing luminance from being lowered at the portion of the optical waveguide plate which is not contacted by the light scattering layer.

With the above arrangement, the display device may further comprise a light reflecting layer disposed on at least a portion of the displacement transmitter assembly which confronts the optical waveguide plate, and the light scattering layer, which is disposed on the displacement transmitter assembly, may be disposed on the light reflecting layer that is disposed on at least the portion of the displacement transmitter assembly which confronts the optical waveguide plate.

The display device may further comprise an optical sheet disposed between the illuminating device and the optical modulator. The optical modulator may comprise a liquid crystal panel having a front panel, a rear panel, and a liquid crystal layer sandwiched between the front panel and the rear panel. In order to increase the luminance on the front surface of the liquid crystal panel, or if the liquid crystal panel includes a polarizer plate, the optical sheet is provided for minimizing loss of light due to the polarizer plate, and reflective light from the optical sheet can be reflected toward the liquid crystal panel. Consequently, the efficiency at which light is utilized increases, and the optical sheet operates effectively and advantageously.

As described above, if the optical modulator operates based on a hold-type display principle, the display device according to the present invention can display moving images in a pseudo-impulse display mode for improved moving image display characteristics and increased light utilization efficiency.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Display devices according to embodiments of the present invention will be described below with reference to FIGS. 1 through 24.

Figure 1:
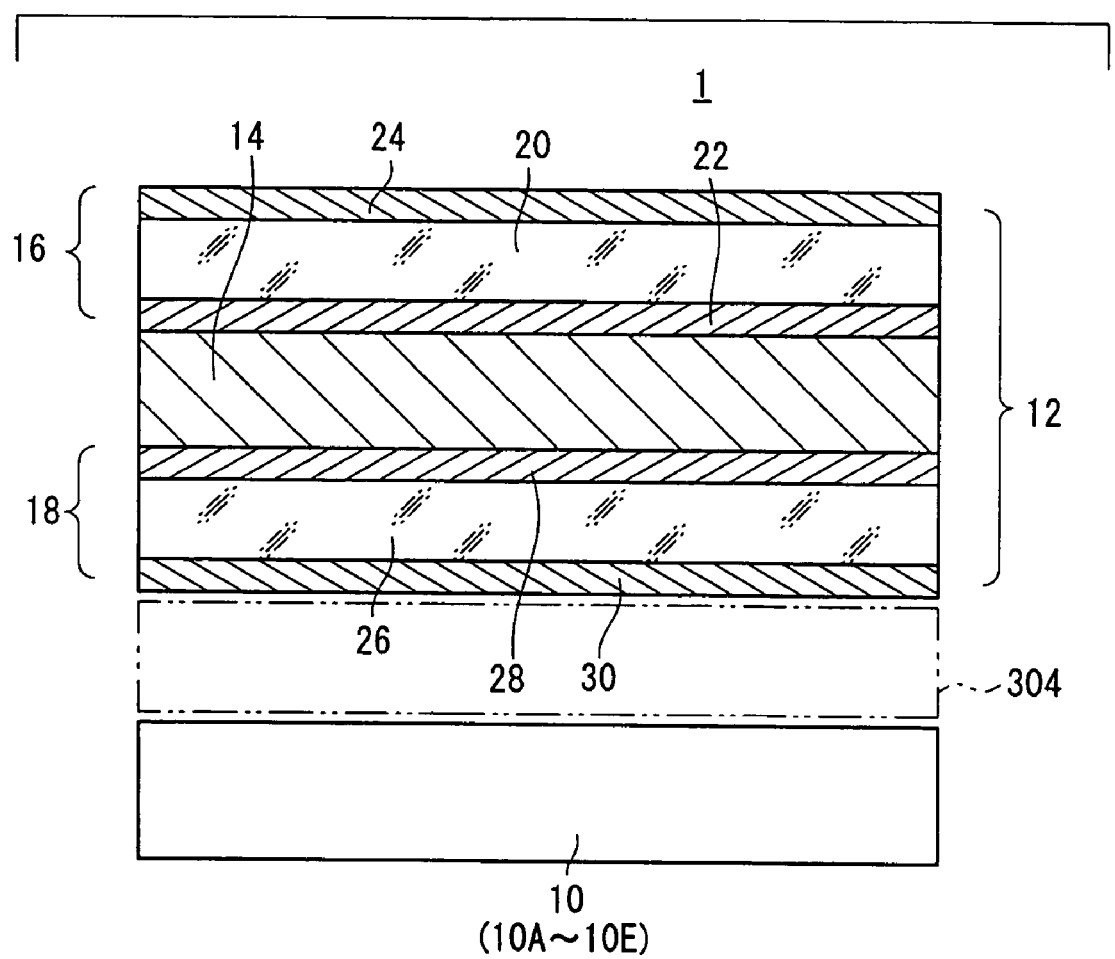
FIG. 1 is a cross-sectional view of a display device according to the present invention.

As shown in FIG. 1, a display device 1 according to the present invention has, as minimum components, a liquid crystal panel 12 serving as an optical modulator and an illuminating device 10 disposed behind the liquid crystal panel 12. The liquid crystal panel 12 is of a structure having a liquid crystal layer 14 sandwiched between a front panel 16 and a rear panel 18. The front panel 16 has a glass plate 20 and a polarizer plate 24 disposed on one surface of the glass plate 20 that is remote from the liquid crystal layer 14. The rear panel 18 has a glass plate 26 and a polarizer plate 30 disposed on one surface of the glass plate 26 that is remote from the liquid crystal layer 14. The liquid crystal panel 12 may employ an optical film, such as a retardation film, which is presently used in many liquid crystal panels.

The liquid crystal panel 12 may be of a twisted nematic (TN) type, an in-plane switching (IPS) type, a vertical alignment (VA) type, or the like.

Figure 2:
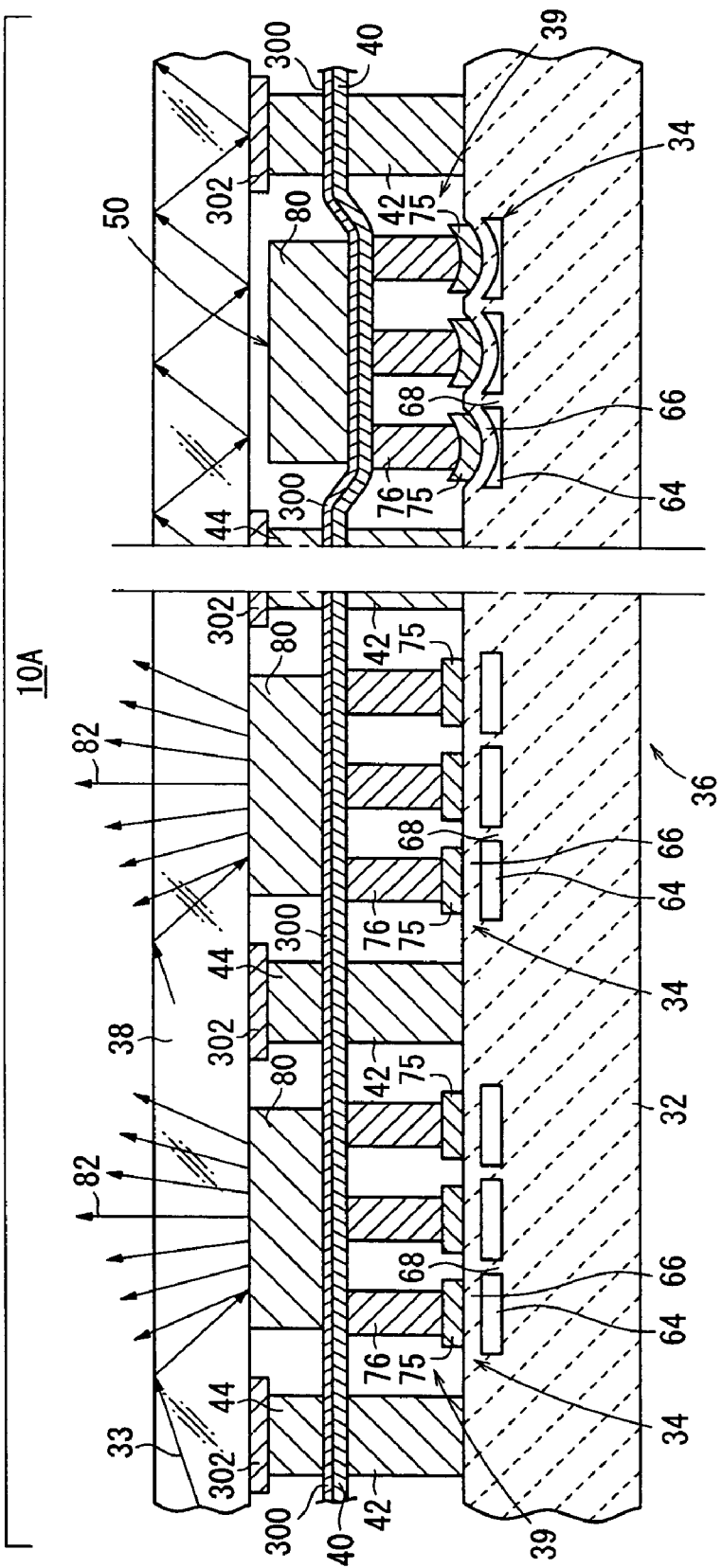
FIG. 2 is a fragmentary cross-sectional view of an illuminating device according to a first embodiment of the present invention.
Figure 3:
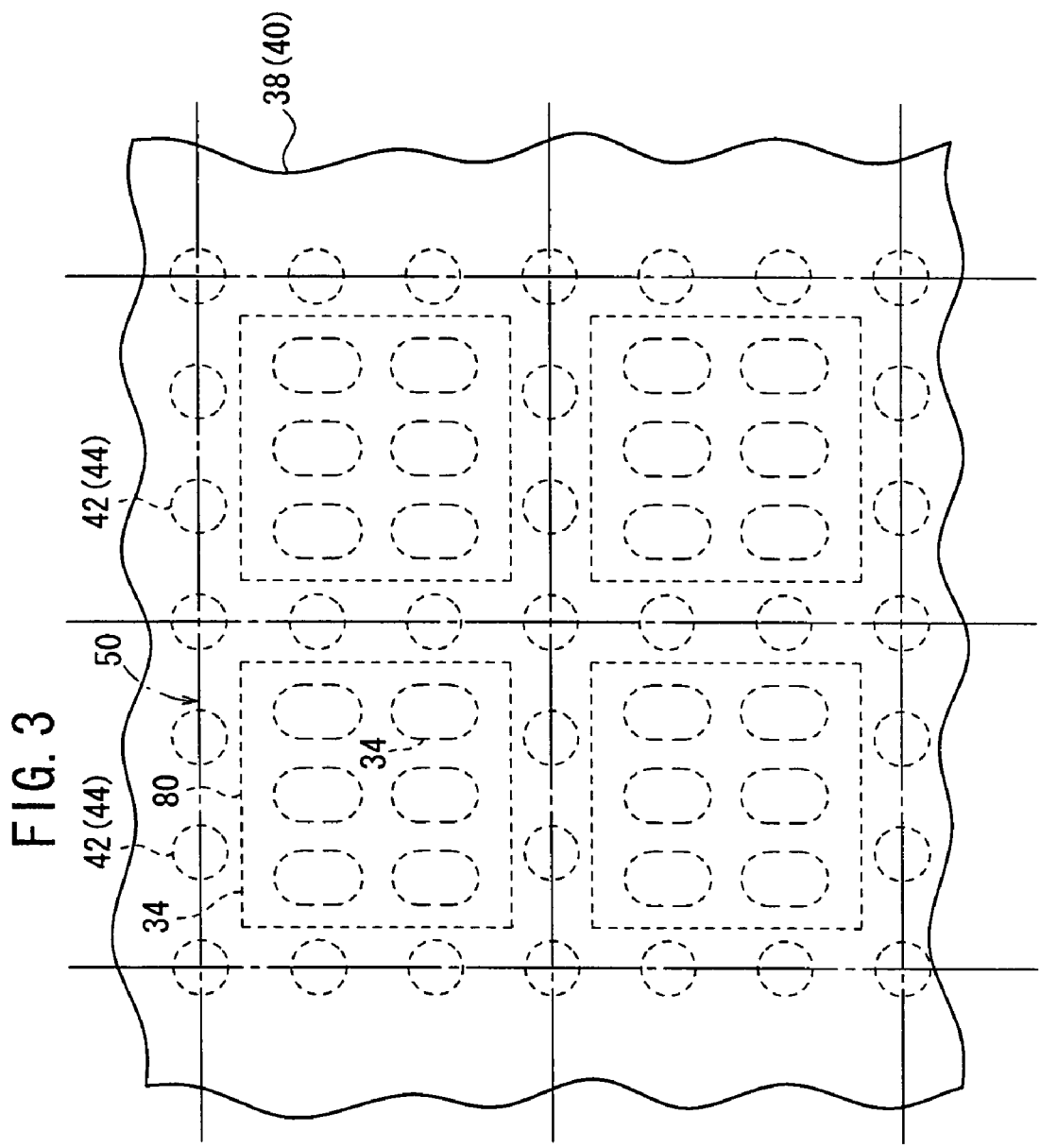
FIG. 3 is an enlarged fragmentary plan view of the illuminating device according to the first embodiment as viewed from an optical waveguide plate.

As shown in FIG. 2, an illuminating device 10A, for use in a display device according to a first embodiment of the present invention, comprises a first optical waveguide plate 38 into which light (incident light) 33 is introduced from a light source (not shown) through an end face thereof, a drive assembly 36 disposed in facing relation to the optical waveguide plate 38 and having a planar array of actuators 34, one or more of which are assigned to each of a plurality of light emission zones 50 (see FIG. 3), and a displacement transmitter assembly 39 disposed between the optical waveguide plate 38 and the drive assembly 36.

Each of the actuators 34 comprises a cavity 64 defined in an actuator substrate 32, a vibrator 66, and an actuator body 75.

Specifically, the cavity 64, which forms the vibrator 66 in a position corresponding to each actuator 34, is defined in the actuator substrate 32. Each cavity 64 is held in communication with the exterior via a through hole (not shown) of small diameter that is defined in an end face of the actuator substrate 32 remote from the actuator 34.

In the actuator substrate 32, a portion where the cavity 64 is defined is thin, and the other portion is thick. The thin portion is of a structure easily vibratable under external stresses and functions as the vibrator 66. The portion other than the cavity 64 is thick and functions as a stationary block 68 supporting the vibrator 66.

Figure 4:
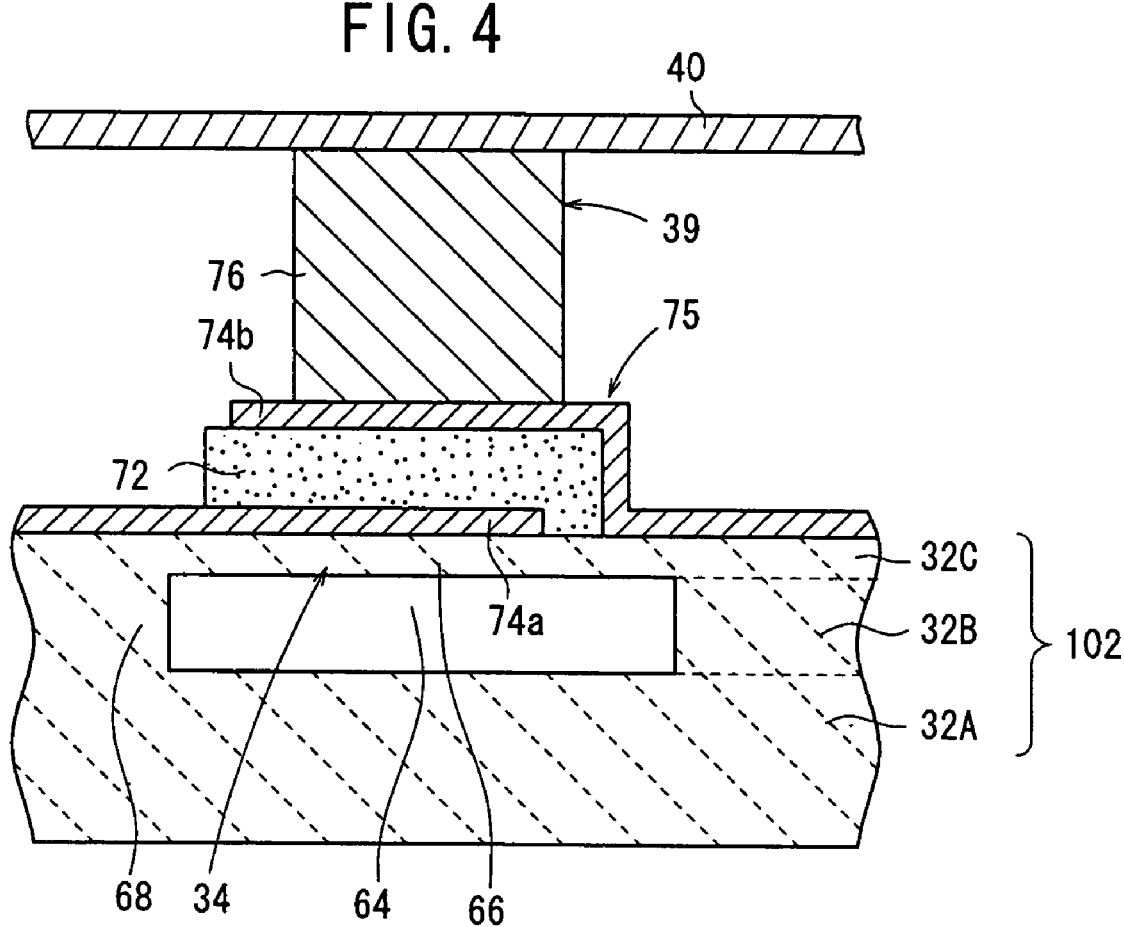
FIG. 4 is a cross-sectional view of an actuator.

As shown in FIG. 4, the actuator substrate 32 comprises a laminated assembly made up of a substrate layer 32A as a lowermost layer, a spacer layer 32B as an intermediate layer, and a thin layer 32C as an uppermost layer, and can be recognized as a unitary structural body in which the cavity 64 is defined in the portion of the spacer layer 32B that corresponds to the actuator 34. The substrate layer 32A functions as a stiffening substrate and also as a wiring substrate. The actuator substrate 32 may be integrally sintered or the layers thereof may be bonded together by an adhesive or the like.

The substrate layer 32A, the spacer layer 32B, and the thin layer 32C may be made of a material which is highly resistant to heat, highly strong, and highly tough, e.g., stabilized zirconium oxide, partially stabilized zirconium oxide, aluminum oxide, magnesium oxide, titanium oxide, spinel, mullite, or the like. The substrate layer 32A, the spacer layer 32B, and the thin layer 32C may be made of a single material or from different materials.

The thin layer 32C has a thickness of 50 µm or less, and is preferably in the range from 3 to 20 µm, for allowing the actuator 34 to be largely displaced.

The spacer layer 32B may be present to provide the cavities 64 in the actuator substrate 32, and is not limited to any thickness. However, the thickness of the spacer layer 32B may be determined depending on the purpose for which the cavities 64 are used. It is preferable that the spacer layer 32B not have a thickness greater than necessary for the actuator 34 to function, and thus should be thin. That is, the thickness of the spacer layer 32B should preferably be only as large as required for the displacement of the actuator 34.

With this arrangement, flexing of the thin portion (the vibrator 66) is limited by the substrate layer 32A, which is close thereto in the direction in which the thin portion flexes, and the thin portion is prevented from being broken as a result of unintended external forces applied thereto. It is possible to stabilize the displacement of the actuator 34 at a particular value, utilizing the ability of the substrate layer 32A to limit flexing of the thin portion.

Since the thickness of the actuator substrate 32 itself and its flexural rigidity can be reduced by making the spacer layer 32B thinner, when the actuator substrate 32 is bonded and fixed to a separate body, buckling or the like of the actuator substrate 32 with respect to the separate body (e.g., the optical waveguide plate 38 or a joint plate 40) can effectively be corrected for increased bonding and fixing reliability.

In addition, as the actuator substrate 32 is thin as a whole, the amount of material used to manufacture the actuator substrate 32 is reduced. Such a structure is therefore advantageous also from the standpoint of manufacturing cost. Specifically, the thickness of the spacer layer 32B should preferably be in the range from 3 to 50 µm, and more preferably, should be in the range from 3 to 20 µm.

Because the spacer layer 32B is thin, the thickness of the substrate layer 32A is equal to or greater than 50 µm, and is preferably in the range from 80 to 300 µm, for the purpose of reinforcing the actuator substrate 32 in its entirety.

A specific example of the actuator 34 will be described below with reference to FIG. 4. As shown in FIG. 4, the actuator 34 has, in addition to the vibrator 66 and the stationary block 68, an actuator body 75 comprising a piezoelectric/electrostrictive layer 72 directly disposed on the vibrator 66, and a pair of electrodes 74a, 74b formed respectively on lower and upper surfaces of the piezoelectric/electrostrictive layer 72.

The electrodes 74a, 74b may be disposed on the lower and upper sides of the piezoelectric/electrostrictive layer 72, as shown in FIG. 4, or on only one side thereof, or on only the upper side of the piezoelectric/electrostrictive layer 72.

If the electrodes 74a, 74b are disposed on only the upper side of the piezoelectric/electrostrictive layer 72, then the electrodes 74a, 74b may be of a planar shape having a number of comb teeth complementarily facing each other, or may be of a swirling or branched shape as disclosed in Japanese Laid-Open Patent Publication No. 10-78549 and Japanese Laid-Open Patent Publication No. 2001-324961.

The electrodes 74a, 74b are made of a metal such as aluminum, titanium, chromium, iron, cobalt, nickel, copper, zinc, niobium, molybdenum, ruthenium, palladium, rhodium, silver, tin, tantalum, tungsten, iridium, platinum, gold, lead, or the like, or an alloy of at least two of these metals. Alternatively, the electrodes 74a, 74b may be made of an electrically conductive material such as a cermet containing the above metal or alloy, to which there is added metal oxide such as aluminum oxide, titanium oxide, zirconium oxide, cerium oxide, copper oxide, or the like, or containing the above metal or alloy in which the material of the actuator substrate 32 and/or the same material as a piezoelectric/electrostrictive material (to be described below) is dispersed.

The electrodes 74a, 74b may be disposed on the actuator substrate 32 by a film forming process such as photolithography, screen printing, dipping, coating, electrophoresis, ion beam process, sputtering, vacuum evaporation, ion plating, chemical vapor deposition (CVD), plating, etc.

Preferred materials that can be used for the material of the piezoelectric/electrostrictive layer 72 include lead zirconate, lead manganese tungstenate, bismuth sodium titanate, bismuth ferrate, sodium potassium niobate, bismuth strontium tantalate, lead magnesium niobate, lead nickel niobate, lead zinc niobate, lead manganese niobate, lead magnesium tantalate, lead nickel tantalate, lead antimony tinate, lead titanate, barium titanate, barium copper tungstenate, lead magnesium tungstenate, lead cobalt niobate, or a composite oxide comprising at least two of the above compounds. The piezoelectric/electrostrictive material may contain a solid solution of an oxide of lanthanum, calcium, strontium, molybdenum, tungsten, barium, niobium, zinc, nickel, manganese, cerium, cadmium, chromium, cobalt, antimony, iron, yttrium, tantalum, lithium, bismuth, tin, copper, etc.

An antiferroelectric layer may be used in place of the piezoelectric/electrostrictive layer 72. In this case, lead zirconate, a composite oxide of lead zirconate and lead tinate, or a composite oxide of lead zirconate, lead tinate, and lead niobate may be used. These antiferroelectric materials may contain a solid solution of the above elements.

A material produced by adding lithium bithmuthate, lead germanate, or the like to the above material, e.g., a material produced by adding lithium bithmuthate or lead germanate to a composite oxide of lead zirconate, lead titanate, and lead magnesium niobate, is preferable because it allows the piezoelectric/electrostrictive layer 72 to be sintered at a low temperature and achieve high material characteristics. The piezoelectric/electrostrictive layer 72 can also be sintered at a low temperature by adding glass (e.g., silicate glass, borate glass, phosphate glass, germanate glass, or a mixture thereof). However, since excessively adding glass may invite deterioration of material characteristics, it is desirable to determine an amount of glass to be added depending on the required characteristics.

If the electrode 74*a* is disposed on the lower surface of the piezoelectric/electrostrictive layer 72 and the electrode 74*b* is disposed on the upper surface of the piezoelectric/electrostrictive layer 72, as shown in FIG. 4, then it is possible to flexurally displace the actuators 34 in one direction, so as to be convex toward the cavities 64, as shown in FIG. 2. Alternatively, it is possible to flexurally displace the actuators 34 in the other direction, so as to be convex toward the joint plate 40.

The opening width (area) of the cavity 64 should preferably be larger than the width (area) of the actuator body 75. However, the opening width (area) of the cavity 64 may be equal to or slightly smaller than the width (area) of the actuator body 75.

The displacement transmitter assembly 39 has a plurality of displacement transmitters 76, each assigned to one actuator 34. Each of the displacement transmitters 76, which serves to transmit the displacement of the actuator body 75 upwardly, may comprise an adhesive, wherein the adhesive may be a filler-containing adhesive.

The displacement transmitter 76 is not limited to any material, but preferably may be made of thermoplastic resin, thermosetting rein, photosetting resin, moisture-absorption-setting resin, cold-setting resin, or the like.

Specifically, acrylic resin, modified acrylic resin, epoxy resin, modified epoxy rein, silicone resin, modified silicone resin, vinyl acetate resin, ethylene-vinyl acetate copolymer resin, vinyl butyral resin, cyanoacrylate resin, urethane rein, polyimide resin, metacryl resin, modified metacryl resin, polyolefin resin, special silicone modified polymer, polycarbonate resin, natural rubber, synthetic rubber, etc. are given by way of example.

Particularly, vinyl butyral resin, acrylic resin, modified acrylic resin, epoxy resin, modified epoxy resin, or a mixture of two or more of these resins is preferable for their excellent bonding strength. Among others, epoxy resin, modified epoxy resin, or a mixture thereof is preferable.

The displacement transmitter assembly 39 has one joint plate 40 connected in common to the displacement transmitters 76. The joint plate 40 and the end faces of the displacement transmitters 76 may be fixed (joined) to each other, or may simply be held in contact with each other. The term "connect" shall be defined and used below as covering the concepts "fix" and "contact." Thus, the actuators 34 and the joint plate 40 are connected to each other by the displacement transmitters 76.

According to the first embodiment, first spacers 42 are disposed between the actuator substrate 32 and the joint plate 40, and second spacers 44 are disposed between the joint plate 40 and the optical waveguide plate 38.

The joint plate 40 is of a material and thickness for providing optimum rigidity to compensate for the displacement of an actuator 34 that may fail to be displaced (defective actuator) due to the displacement of a normal actuator 34 that is connected to the joint plate 40.

Specifically, the joint plate 40 may be made of a metal, ceramic, glass, or an organic resin, but is not limited to any particular materials, insofar as such materials are capable of the functions described above. For example, SUS304 (Young's modulus: 193 GPa, coefficient of linear expansion: $17.3\times10^{-6}/C°$), SUS403 (Young's modulus: 200 GPa, coefficient of linear expansion: $10.4\times10^{-6}/C°$), zirconium oxide (Young's modulus: 245.2 GPa, coefficient of linear expansion: $9.2\times10^{-6}/C°$), and glass (e.g., Corning 0211, Young's modulus: 74.4 GPa, coefficient of linear expansion: $7.38\times10^{-6}/C°$) are preferably used. In the present embodiment, the joint plate 40 comprises a SUS plate having a thickness preferably in the range from 10 µm to 300 µm.

The first and second spacers 42, 44 should preferably be made of a material that does not become deformable in the presence of heat and pressure, e.g., the material may be a thermosetting rein such as epoxy resin or the like, a photosetting resin, a moisture-absorption-setting resin, a cold-setting resin, or the like.

A filler may be incorporated into the first and second spacers 42, 44. First and second spacers 42, 44 with fillers contained therein possess a higher hardness and greater heat resistance, strength, and dimensional stability than spacers with no filler contained therein. The spacers 42, 44 with fillers contained therein are also deformable by a much smaller amount than spacers with no filler contained therein, due to an increase in the temperature in the illuminating device 10A. Stated otherwise, the hardness, heat resistance, and strength of the set resin can be increased, and the amount by which it thermally expands and shrinks can be greatly reduced, by incorporating a filler into the first and second spacers 42, 44.

The illuminating device 10A for use in the display device according to the first embodiment also includes a light reflecting layer 300 disposed on the entire upper surface of the joint plate 40, light reflecting layers 302 disposed between the second spacers 44 and the optical waveguide plate 38, and one or more light scattering layers 80 disposed in each of positions on the upper surface of the light reflecting layer 300 which correspond to the respective light emission zones 50.

The light scattering layers 80 may be made of a colored (including white) transparent material or a colored semitransparent material. The light scattering layers 80 may be made of a transparent material including different materials having pores or the like. Preferably, the light scattering layers 80 should be made of a material having two or more different phases, e.g., a resin material mixed with a powder.

The resin material may be any of various organic resins including acrylic resin, polycarbonate resin, styrene resin, epoxy resin, silicone resin, polyolefin, etc. However, the light scattering layers 80 may be made of rubber, glass, or the like.

The powder may be a ceramic powder, a resin powder, or any of various powders having different properties from the above resins (including combinations thereof). The resin material may contain air bubbles instead of being mixed with the powder.

More preferably, the difference between the refractive indexes of the above two or more different phases should be increased, for providing increased scattering efficiency of the light scattering layers as well as for reducing thickness thereof.

Specifically, a ceramic powder having a high refractive index, e.g., a powder of $TiO_2$, $ZrO_2$, $Ta_2O_5$, $CeO_2$, $NbO_5$, PbO, or the like, should preferably be used. The refractive index of the ceramic powder should be 2.0 or greater, or more preferably, be 2.5 or greater. Of the above organic resins, resins having a refractive index of 1.7 or smaller, or more preferably, 1.5 or smaller are preferable.

The thickness of the light scattering layers 80 should preferably be in the range from 3 µm to 50 µm, or more preferably, in the range from 5 µm to 15 µm.

The light reflecting layer 300 should preferably comprises a metal film produced by evaporation, or an applied metal foil.

The metal film should preferably be made of Ag or Al, because of its high reflectance and adequate flexibility. The thickness of the light reflecting layer 300 should preferably be in the range from 0.001 µm to 100 µm, or more preferably, be in the range from 0.1 µm to 20 µm.

The light reflecting layers 302 may be made of the same material as the light reflecting layer 300. However, although the light reflecting layers 302 need to be adequately flexible, the light reflecting layer 300 should preferably be rigid. The thickness of the light reflecting layers 302 should preferably be in the range from 0.001 µm to 1000 µm, or more preferably, be in the range from 0.1 µm to 100 µm.

The formation of films, such as the electrodes 74a, 74b, the piezoelectric/electrostrictive layer 72, and the first and second spacers 42, 42, on the actuator substrate 32, the formation of the second spacers 44 on the light reflecting layers 302, and the formation of the light reflecting layer 300 and the light scattering layers 80 on the joint plate 40 are not limited to any particular process, but may be performed by various known film formation processes.

For example, films may be grown on the surfaces of the actuator substrate 32 and the joint plate 40 by a film applying process which directly applies a chip-like or web-like film, a thick-film forming process such as a screen printing process, a photolithographic process, a spray dipping process, or a coating process, or a thin-film forming process such as an ion beam process, a sputtering process, a vacuum evaporation process, an ion plating process, a chemical vapor deposition (CVD) process, a plating process, or the like, which applies a powder, a paste, a liquid, a gas, ions, or the like, as a raw material of the film.

Operation of the illuminating device 10A shall briefly be described below with reference to FIGS. 2 and 4. First, light 33 is introduced into the optical waveguide plate 38 from an end thereof, for example. When the light scattering layers 80 are held out of contact with the optical waveguide plate 38, all of the light 33 is totally reflected within the optical waveguide plate 38 without passing through front and back surfaces thereof, by appropriately adjusting the magnitude of the refractive index of the optical waveguide plate 38. The refractive index of the optical waveguide plate 38 is desirably in the range from 1.3 to 1.8, or more desirably, in the range from 1.4 to 1.7.

When the actuators 34 are in their natural state, the light scattering layers 80 have their end faces held in contact with the back of the optical waveguide plate 38, at a distance equal to or smaller than the wavelength of the introduced light 33. Therefore, the introduced light 33 is reflected as scattered light 82 by the surfaces of the light scattering layers 80. Such scattered light 82 is partly reflected again within the optical waveguide plate 38, but mostly passes through the principal surface of the optical waveguide plate 38 without being reflected by the optical waveguide plate 38. Therefore, all the actuators 34 are turned on, emitting light whose color corresponds to the color of the light scattering layers 80. Since the actuators 34 corresponding to all the light emission zones are turned on, white light is emitted from the principal surface of the optical waveguide plate 38 of the illuminating device 10A.

Furthermore, a low-level voltage (e.g., −10 V) is applied as a drive voltage between the electrodes 74b, 74a of the actuators 34, to press the end faces of the light scattering layers 80 against the back of the optical waveguide plate 38, for more reliably turning on the actuators 34 for producing a stable display.

When a high-level drive voltage (e.g., 50 V) is then applied between the electrodes 74b, 74a of six actuators 34 corresponding to a certain light emission zone, those six actuators 34 are flexurally displaced, as to be flex convexly toward the cavities 64, i.e., be flexurally displaced downwardly, as shown in FIG. 2. Consequently, the drive displacement is transmitted through the displacement transmitters 76 and the joint plate 40 to the light scattering layers 80. The end faces of the light scattering layers 80 are now spaced from the optical waveguide plate 38, so that the actuators 34 corresponding to the light emission zone 50 are turned off, extinguishing light emission therefrom.

Therefore, the illuminating device 10A can control whether there is light emission (scattered light 82) on the principal surface of the optical waveguide plate 38 or not, based on whether the light scattering layers 80 contact the optical waveguide plate 38 or not.

In the above-described illuminating device 10A, for use in the display device according to the first embodiment, when the light scattering layers 80 in all the light emission zones 50 are brought into contact with the optical waveguide plate 38, light 82 is emitted from the entire principal surface (light emission surface) of the optical waveguide plate 38. For increasing the front luminance of the liquid crystal panel 12, and minimizing loss of light caused by the polarizer plates, an optical sheet 304 (indicated by the two-dot-and-dash lines in FIG. 1) is disposed between the illuminating device 10A and the liquid crystal panel 12.

The optical sheet may comprise a prism sheet, for converging light toward the front surface of the liquid crystal panel 12, or a reflective polarizing film for minimizing loss of light caused by the polarizer plates, or a combination of the prism sheet and the reflective polarizing film. In the present embodiment, BEFII90/50 manufactured by Sumitomo 3M is used as the prism sheet, and DBEF-D manufactured by Sumitomo 3M is used as the reflective polarizing film. The prism sheet converges light from behind, i.e., from the illuminating device 10A, toward the front surface of the liquid crystal panel 12 and passes the light therethrough. However, the prism sheet returns about one-half of the light backward due to total reflection by the prism. The reflective polarizing film passes only a P-polarized component, and reflects an S-polarized component backward. Both of the above optical sheets return a considerably large amount of light, i.e., reflexive light, backward. Therefore, using the optical sheet tends to lower the efficiency at which the light is used. Ordinary illuminating devices, if they employ such an optical sheet, also have a reflective sheet disposed on the bottom thereof, for reflecting light for reuse, and increasing the efficiency at which the light is used.

According to the first embodiment, the light reflecting layer 300 is disposed on the entire upper surface of the joint plate 40, and the light reflecting layers 302 are disposed between the second spacers 44 and the optical waveguide plate 38. Therefore, as with ordinary illuminating devices, reflective light is reflected forward by the light reflecting layers, and hence the optical sheet 304 advantageously is effective in increasing the efficiency at which light is used.

According to the first embodiment, consequently, light 82 can be emitted efficiently from the principal surface (light emission surface) of the optical waveguide plate 38.

When the actuators 34 of the drive assembly 36 are selectively displaced to bring the light scattering layers 80 for selected light emission zones 50 into contact with the optical waveguide plate 38, light 82 is emitted from a portion of the principal surface of the optical waveguide plate 38. Thus, light 82 is selectively emitted from a portion of the principal surface of the optical waveguide plate 38, and further, light 82 can be emitted from successive regions that are shifted stepwise by selectively displacing the actuators 34 in constant periodic cycles, e.g., periodic cycles consistent with the vertical scanning signal of the liquid crystal panel 12.

Figure 5:
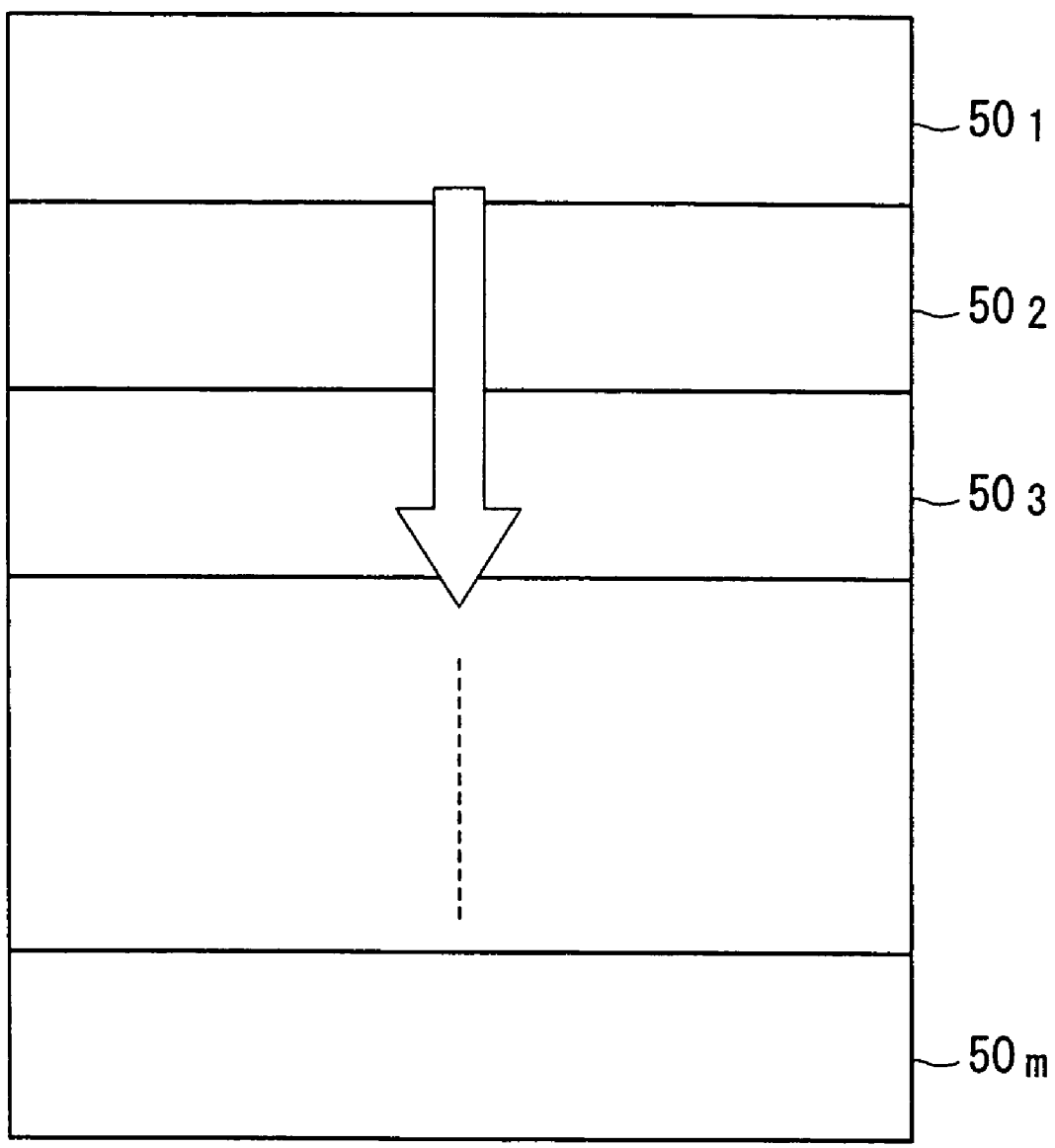
FIG. 5 is a view illustrative of the manner in which a plurality of light emission zones arranged in a vertical array are successively energized vertically in synchronism with the period of a vertical scanning signal for a liquid crystal panel.
Figure 6:
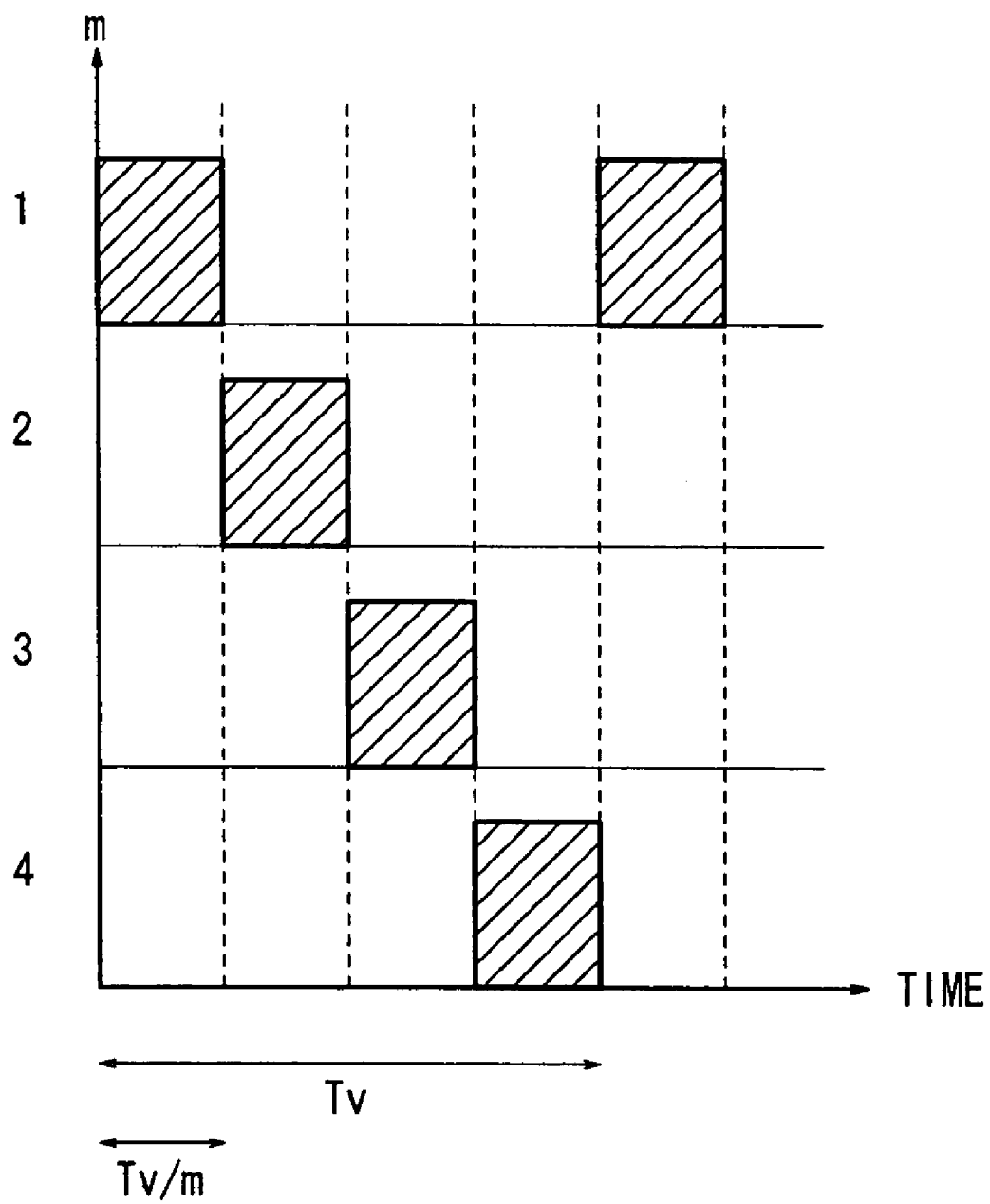
FIG. 6 is a timing chart of respective light emission times of light emission zones.

For example, as shown in FIG. 5, m light emission zones $50_1, 50_2, 50_3, \ldots, 50_m$ are arranged in a vertical array, and it is assumed that one periodic cycle of the vertical scanning signal has a period Tv. The light emission zones $50_1, 50_2, 50_3, \ldots, 50_m$ are controlled to emit light at successively different times that are shifted by respective intervals of (Tv/m). Specifically, the light emission zone $50_2$ emits light at the period of (Tv/m) after the light emission zone $50_1$ emits light, and the light emission zone $50_3$ emits light at the period of (Tv/m) after the light emission zone $50_2$ emits light. Similarly, the subsequent light emission zones emit light at respective successively shifted times until the light emission zone $50_m$ emits light. After each light emission zone has emitted light, it is turned off, i.e., emission of light therefrom is extinguished. At a period of (Tv/m) after the light emission zone $50_m$ emits light, the light emission zone $50_1$ emits light again. If the light emission zones emit light for identical periods of time, then the light emission zones are successively turned on to emit light. If the light emission zones emit light for respective periods of time that are shorter than the period of (Tv/m), then no light emission zones simultaneously emit light. Specifically, if the vertical scanning signal of a video signal has a frequency of 60 Hz, then one periodic cycle of the vertical scanning signal has a period Tv of 1/60 second, and if there are four light emission zones (i.e., m=4), then the light emission zones emit light at successively different times that are shifted by respective intervals of (1/240) second. FIG. 6 shows respective light emission times of the light emission zones. In FIG. 6, the horizontal axis represents time and the vertical axis represents light emission intensities of the respective light emission zones. The first light emission zone starts emitting light from time 0, for example. The second light emission zone starts emitting light at the period of 1/240 seconds after the first light emission zone. The third light emission zone starts emitting light at the period of 1/240 second after the second light emission zone. The fourth light emission zone starts emitting light at the period of 1/240 second after the third light emission zone. The period of time for which each light emission zone emits light may be of any value. If the period of time for which each light emission zone emits light is 1/240 second, then there are no light emission zones which simultaneously emit light, but the light emission zones are successively turned on to emit light, as shown in FIG. 6. When attention is given to a certain light emission zone, the light emission zone emits light at periodic intervals Tv of 1/60 second for a period of time which may not necessarily be the same as, but may be longer or shorter than, the period of time at which the light emission times of adjacent light emission zones are shifted one from the other. If shorter, then the efficiency at which to light is utilized is low, because times exist in which no light is emitted from any of the light emission zones. If longer, effectiveness of the pseudo-impulse display mode is reduced, because the extinguished time, i.e., the period of time at which each light emission zone emits no light, is made shorter.

Figure 7:
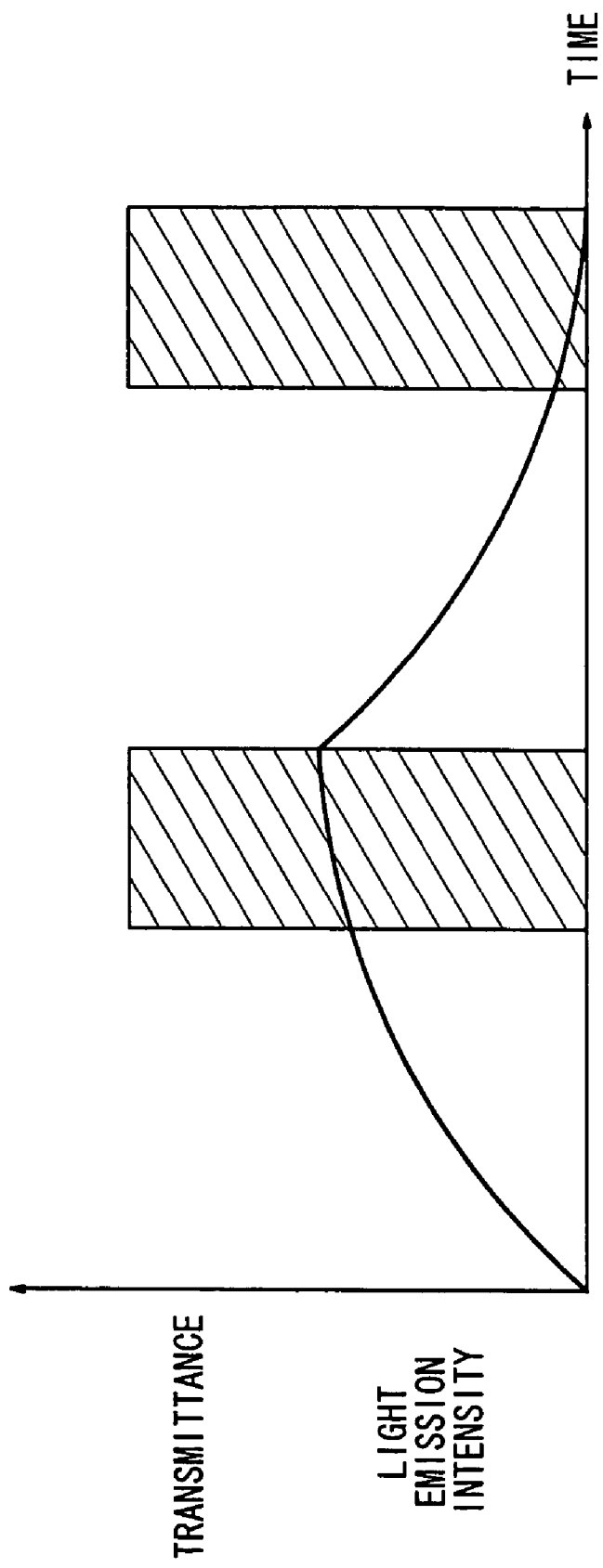
FIG. 7 is a timing chart of light emission times of the liquid crystal panel with respect to the light emission period of each light emission zone.

FIG. 7 shows how each light emission zone emits light and also how the liquid crystal panel 12 is energized, with respect to time. In FIG. 7, the horizontal axis represents time, and the vertical axis represents the light emission intensity of a certain light emission zone (e.g., $50_1$) of the illuminating device 10A and the transmittance of the liquid crystal panel 12. If the vertical scanning signal of the video signal has a frequency of 60 Hz, as described above, then the light emission zone changes its light emission in 1/60 second. If the liquid crystal panel 12 switches between a transmitting state and an extinguished state during every period, then the liquid crystal panel 12 gradually changes from the transmitting state to the extinguished state in one period, and then gradually changes from the extinguished state to the transmitting state in the next period, as shown in FIG. 7. In order for the liquid crystal panel 12 to switch between the transmitting state and the extinguished state during every period, the liquid crystal of the liquid crystal panel 12 must respond in about 16.6 msec. or less if the vertical scanning signal has a frequency of 60 Hz. Actually, however, the liquid crystal responds gradually as shown in FIG. 7. Therefore, each light emission zone should desirably emit light within the latter half of one period in which the liquid crystal responds. Light emission from each light emission zone is indicated by rectangular pulses, which are hatched, as shown in FIG. 7. In the first period, since the light emission zone emits light while the liquid crystal is in the transmitting state, the liquid crystal panel 12 is in a bright state. In the second period, since the light emission zone emits light while the liquid crystal is in an extinguished state, the liquid crystal panel 12 is in a dark state. Such a pseudo-impulse display mode of the liquid crystal panel 12 reduces afterimages and also reduces degradation of gradation characteristics, which otherwise would be caused by the gradual response of the liquid crystal. Stated otherwise, since the light emission zone emits light during periods in which the liquid crystal has already responded substantially fully, the liquid crystal panel 12 does not produce a display during periods in which the transmittance thereof is gradually changing, and hence appropriate gradations or display levels can be displayed.

According to the first embodiment, the light reflecting layers 302 are disposed between the second spacers 44 and the optical waveguide plate 38. At the boundaries of the light emission zones 50, luminance tends to be lowered because the light scattering layers 80 are not held in contact with the optical waveguide plate 38. However, the light reflecting layers 302 on the second spacers 44 can scatter light 33 introduced into the optical waveguide plate 38, in order to minimize the reduction in the luminance at the boundaries of the light emission zones 50.

The illuminating device 10A may be made lower in profile if the thickness of the light scattering layers 80 is reduced. However, reducing the thickness of the light scattering layers 80 may also allow light applied thereto to pass through the light scattering layers 80, thus preventing light from being emitted from the illuminating device 10A. According to the present embodiment, the light reflecting layer 300, which is disposed beneath the light scattering layers 80, reflects light that has passed through the light scattering layers 80, thereby reducing reduction in luminance which could be caused by the reduced thickness of the light scattering layers 80.

One displacement transmitter 76 is assigned to each actuator 34. If a plurality of actuators 34 are present in one light emission zone 50, according to the first embodiment, then even when some of the actuators 34 become defective, their displacement can be compensated for by the normal actuators 34. Therefore, the yield of the drive assembly 36 can be increased.

As described above, the illuminating device 10A for use in the display device according to the first embodiment is capable of not only applying light to the entire surface of the liquid crystal panel 12, but is also capable of selectively applying light to a portion of the liquid crystal panel 12, or applying light to successively shifted regions of the liquid crystal panel 12 in synchronism with periodic cycles of a vertical scanning signal. The display device can thus display images both in an ordinary hold-type display mode and in a pseudo-impulse display mode, thereby reducing afterimages.

The materials making up major components of the illuminating device 10A according to the first embodiment have been described above. Materials of other components, including the actuator substrate 32, the optical waveguide plate 38, etc., shall now be described below.

The light source for emitting the light 33 that is introduced into the optical waveguide plate 38 may be an incandescent lamp, a heavy-hydrogen discharge lamp, a fluorescent lamp, a mercury lamp, a metal halide lamp, a halogen lamp, a xenon lamp, a tritium lamp, a light-emitting diode, a laser, a plasma light source, a hot-cathode tube, a cold-cathode tube, or the like.

The vibrator 66 should preferably be made of a highly heat-resistant material. In particular, if the vibrator 66 is directly supported by the stationary block 68 without using a heat-resistant material such as an organic adhesive or the like, the vibrator 66 should preferably be made of a highly heat-resistant material in order to prevent it from becoming altered when the piezoelectric/electrostrictive layer 72 is formed.

The vibrator 66 should preferably be made of an electrically insulating material in order to electrically isolate the interconnection (e.g., the row selection line) connected to one electrode 74a on the actuator substrate 32 from the interconnection (e.g., the signal line) connected to the other electrode 74b.

Therefore, the vibrator 66 may be made of a material, such as an enameled material, wherein a highly heat-resistant metal, or its surface, is covered with a ceramic material such as glass or the like. In particular, ceramic is considered optimum as the material for the vibrator 66.

Ceramic materials for the vibrator 66 may be stabilized zirconium oxide, aluminum oxide, magnesium oxide, titanium oxide, spinel, mullite, aluminum nitride, silicon nitride, glass, or a mixture thereof. Stabilized zirconium oxide is particularly preferable because it has high mechanical strength, high tenacity, and produces only relatively small chemical reactions with the piezoelectric/electrostrictive layer 72 and the electrodes 74a, 74b, even when the vibrator 66 is made thin. Stabilized zirconium oxide includes both stabilized zirconium oxide and partially stabilized zirconium oxide. Stabilized zirconium oxide also does not experience a phase transition, because it has a crystalline structure comprising a cubic structure or the like.

Zirconium oxide experiences a phase transition between a monoclinic structure and a tetragonal structure at about 1000° C., and may crack upon undergoing such a phase transition. Stabilized zirconium oxide contains 1-30 mol % of calcium oxide, magnesium oxide, yttrium oxide, scandium oxide, ytterbium oxide, sodium oxide, or an oxide of a rare earth metal. The stabilizer should preferably contain yttrium oxide for increasing the mechanical strength of the vibrator 66. The stabilizer should preferably contain 1.5 to 6 mol % of yttrium oxide, or more preferably 2 to 4 mol % of yttrium oxide, and furthermore should preferably contain 0.1 to 5 mol % of aluminum oxide.

The crystalline phase may be a mixture of cubic and monoclinic systems, a mixture of tetragonal and monoclinic systems, or a mixture of cubic, tetragonal and monoclinic systems. A mixture of cubic and monoclinic systems, or a mixture of tetragonal and monoclinic systems as a major crystalline phase, is most preferable from the standpoints of strength, tenacity, and durability.

If the vibrator 66 is made of ceramics, then it is constructed of relatively many crystal grains. In order to increase the mechanical strength of the vibrator 66, the average diameter of the crystal grains should preferably be in the range from 0.05 to 2 μm, and more preferably, in the range from 0.1 to 1 μm.

The stationary block 68 should preferably be made of ceramics. The stationary block 68 may be made of a ceramic, which is the same or different from the ceramic used for making the vibrator 66. Similar to the material for the vibrator 66, the ceramics of the stationary block 68 may be stabilized zirconium oxide, aluminum oxide, magnesium oxide, titanium oxide, spinel, mullite, aluminum nitride, silicon nitride, glass, or a mixture thereof.

The actuator substrate 32 used in the illuminating device 10A, for use in the display device according to the first embodiment, is made of a material containing zirconium oxide as a chief component, a material containing aluminum oxide as a chief component, or a material containing a mixture of zirconium oxide and aluminum oxide as a chief component. The material chiefly containing zirconium oxide is most preferable.

Clay or the like may be added as a sintering additive. Components of the sintering additive need to be adjusted so that the sintering additive does not contain excessive amounts of materials that can easily vitrify, e.g., silicon oxide, boron oxide, etc. This is because, while easily vitrifiable materials are advantageous in joining the actuator substrate 32 to the piezoelectric/electrostrictive layer 72, they tend to promote a reaction between the actuator substrate 32 and the piezoelectric/electrostrictive layer 72, making it difficult to maintain a desired composition of the piezoelectric/electrostrictive layer 72 and also resulting in a reduction in device characteristics.

Specifically, silicon oxide or the like in the actuator substrate 32 should preferably be limited to 3% by weight or less, or more preferably, to 1% by weight or less. The chief component referred to above is a component that occurs at 50% by weight or more.

The optical waveguide plate 38 has a refractive index such that light 33 introduced therein is totally reflected within the optical waveguide plate 38 without passing through the front and back surfaces thereof. The optical waveguide plate 38 must provide a uniform and high transmittance within the wavelength range of the introduced light 33. The optical waveguide plate 38 is not limited to particular materials, insofar as they possess the above characteristics. Specific materials thereof may include glass, quartz, light-transmissive plastics such as acrylic resin or the like, light-transmissive ceramics, a plural-layer structural body of materials having different refractive indexes, or a material having a coating layer on its surface.

Figure 8:
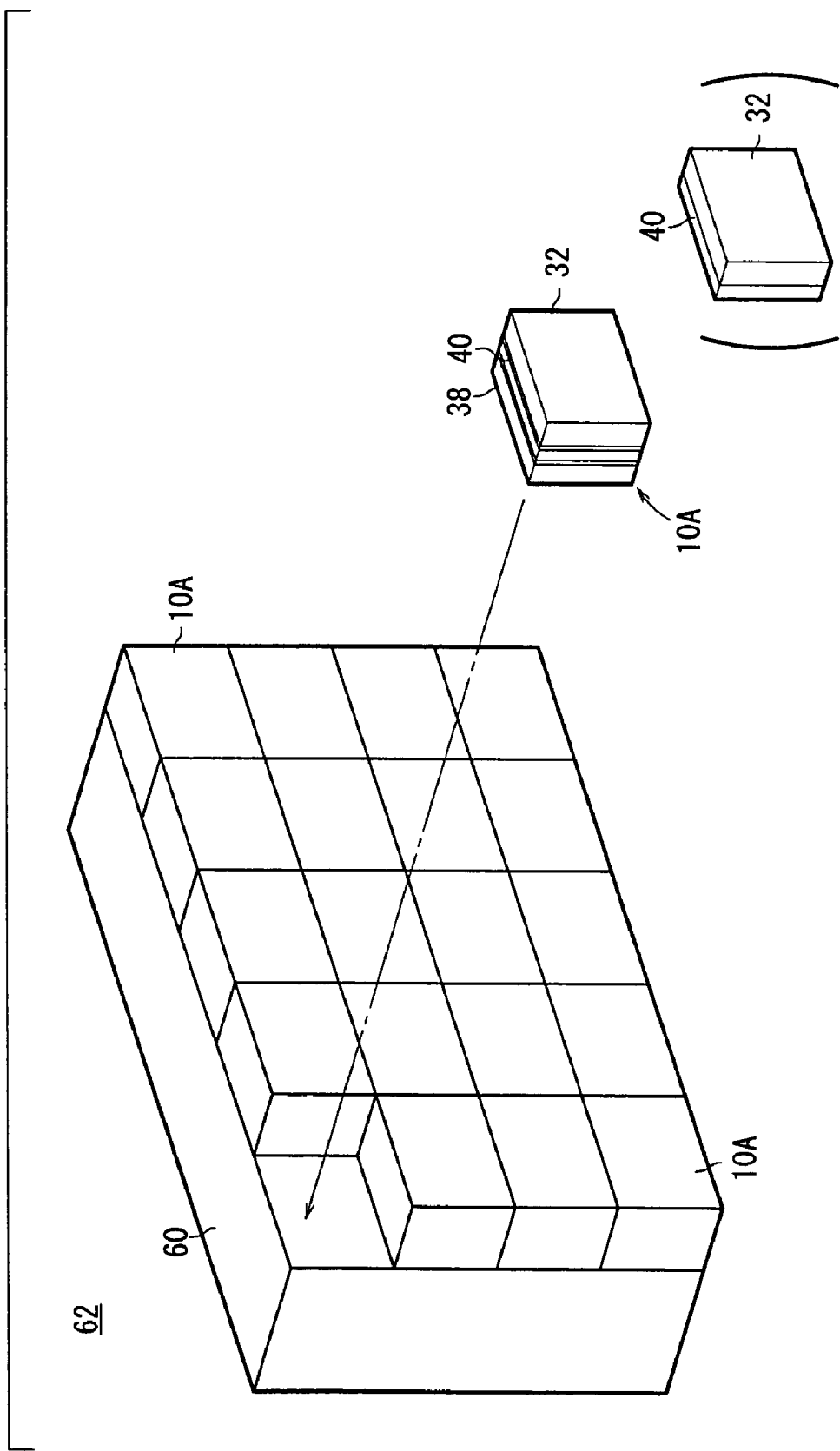
FIG. 8 is a perspective view of an illuminating device for a large screen.

In the above embodiment, one illuminating device 10A is installed in combination with the liquid crystal panel 12. However, a plurality of illuminating devices 10A may arranged in a matrix on the back of a single light guide plate 60, as shown in FIG. 8, thus providing an illuminating device 62 for use in a large-screen display device.

The light guide plate 60 comprises a glass plate, an acrylic plate, or the like, whose light transmittance is large and uniform within the visible range. The illuminating devices 10A are connected by wire bonding, soldering, end-face connectors, reverse-side connectors, etc., for transmitting signals therebetween.

The light guide plate 60 and the illuminating devices 10A should preferably have similar refractive indexes. When the light guide plate 60 and the optical waveguide plates 38 are bonded to each other, then a transparent adhesive or liquid should be used to bond them together. The transparent adhesive or liquid should preferably have a uniform and high light transmittance within the visible range, similar to that of the light guide plate 60 and the optical waveguide plates 38, and a refractive index close to those of the light guide plate 60 and the optical waveguide plates 38, for reducing loss of light and achieving screen brightness.

In the above embodiment, surfaces of the optical waveguide plates 38 of the illuminating devices 10A are bonded to the light guide plate 60, thus constructing the illuminating device 62 usable in a large-screen display device. As indicated by parentheses in FIG. 8, the optical waveguide plates 38 may be dispensed with, wherein end faces of the spacers 44 (see FIG. 2) are directly bonded to the light guide plate 60, similarly constructing the illuminating device 62 usable in a large-screen display device.

Figure 9:
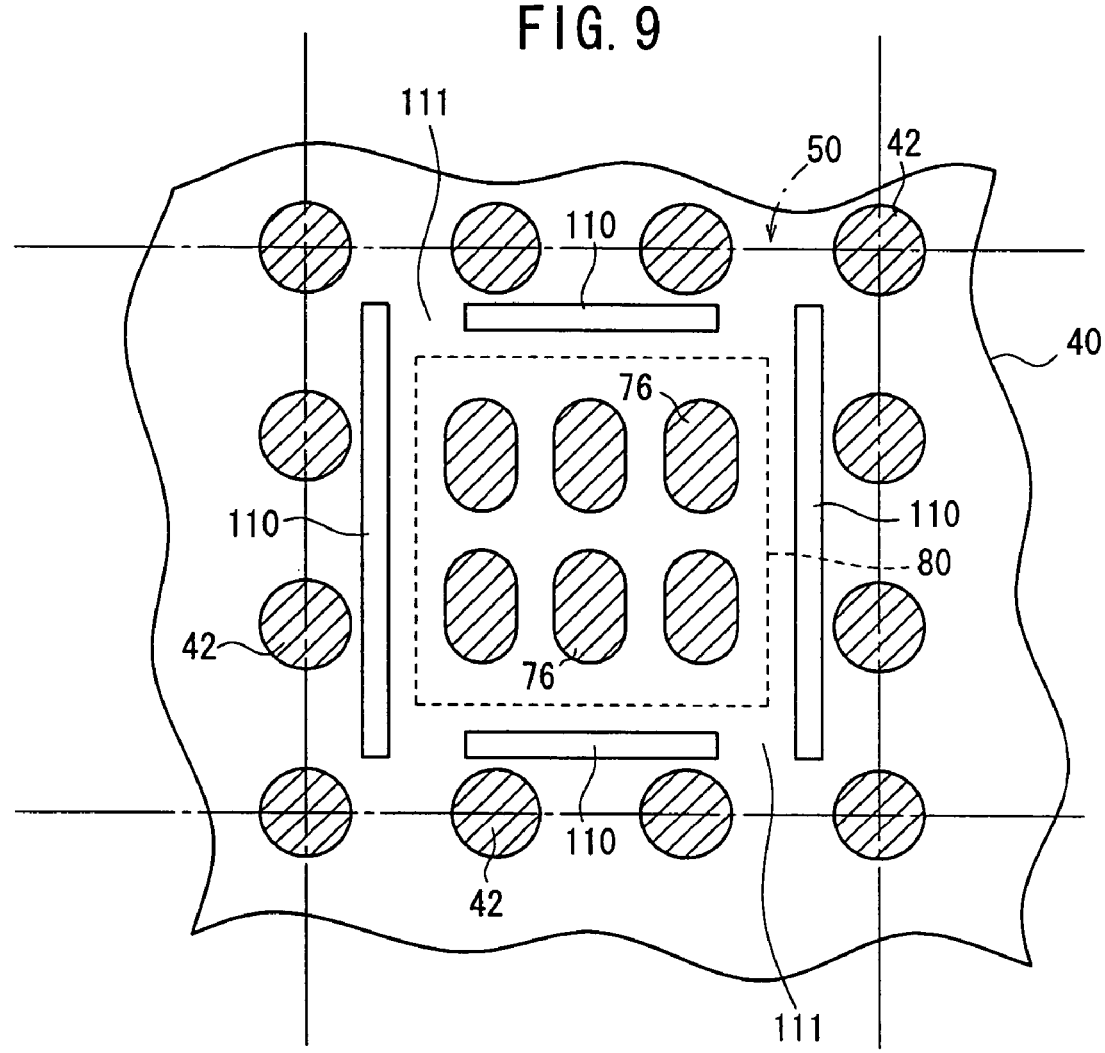
FIG. 9 is a fragmentary rear view of a joint plate with slits defined therein near spacers.

With the illuminating device 10A for use in a display device according to the first embodiment as described above, the single joint plate 40 is disposed between the optical waveguide plate 38 and the actuator substrate 32, and the first and second spacers 42, 44 are disposed between the actuator substrate 32 and the joint plate 40, as well as between the optical waveguide plate 38 and the joint plate 40, in alignment with the respective light emission zones 50. Consequently, in regions of the joint plate 40 close to the first and second spacers 42, 44, displacement of the joint plate 40 itself tends to be reduced due to the tension of the joint plate 40 (i.e., its rigidity increases). However, as shown in FIG. 9, if slits 110 are formed in portions of the joint plate 40 close to the first spacers 42, then the rigidity of the above portions is lowered, thus avoiding displacement reduction and lessening thermal and mechanical stress.

The slits 110 allow light to pass and be absorbed by the actuator substrate 32, resulting in a reduction in the luminance. To solve this problem, according to a first modification shown in FIG. 10, an illuminating device 10Aa has a light reflecting layer 306 disposed on the actuator substrate 32. Light that has passed through the slits 110 is reflected by the light reflecting layer 306 disposed on the actuator substrate 32, and is emitted from the optical waveguide plate 38. Therefore, the illuminating device 10Aa is effective to prevent luminance from being lowered.

When slits 110 are formed in the joint plate 40, portions of the joint plate 40 are formed that are narrowed by the slits 110, i.e., portions (hereinafter simply referred to as arms 111) interconnecting the boundary regions (stationary regions) of the light emission zones 50 and regions (movable regions) corresponding to the light scattering layers 80.

In order to keep the displacement of the regions of the joint plate 40, which correspond to the light scattering layers 80, and allow the joint plate 40 to be handled easily during the fabrication process, it is of course suitable for the arms 111 to be suitably rigid, while it is also preferable to optimize the shape, thickness and structure of the arms 111. In particular, the movable regions should have increased flexural rigidity to compensate for the displacement of defective actuators, whereas the arms 111 should be less flexurally rigid.

The slits 110 can be formed in the joint plate 40, and the thickness of the arms 111 can be made larger than surrounding regions by a half-etching process, a sand blasting process, or the like. The stationary regions may be clamped, and the movable regions may then be lowered in the direction of the thickness thereof to elongate the arms 111, and thereafter, the movable regions may be raised in an opposite direction to make the side elevational shape of the arms 111 in an arch shape, which is effective to reduce reduction in displacement as a result of the tension of the arms 111. The planar shape of the arms 111 may be of an L shape, a swirling shape, a bellows shape, or the like, as well as a straight shape as shown in FIG. 9, thereby increasing the length of the arms 111.

Figure 11:
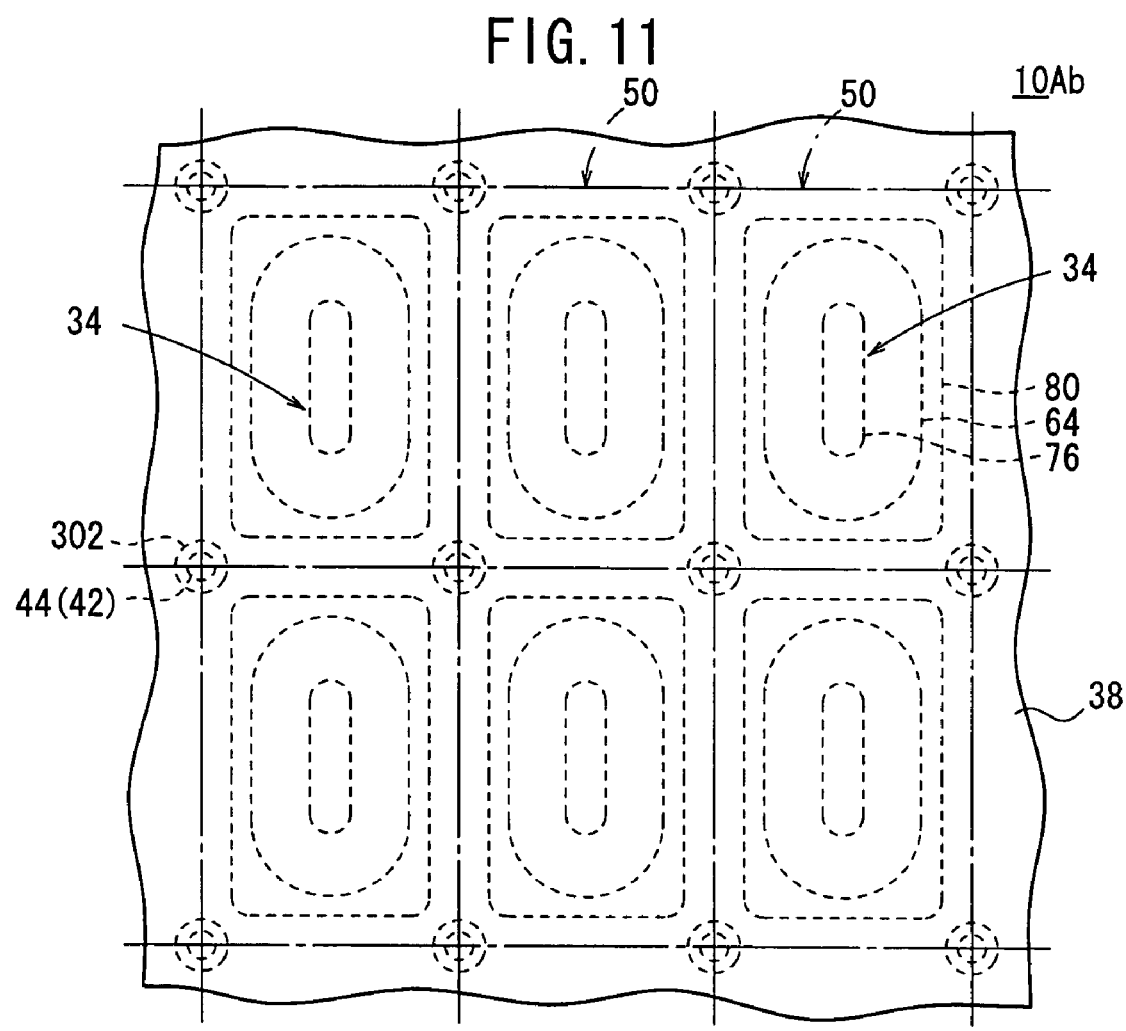
FIG. 11 is a fragmentary plan view of a second modification of the illuminating device according to the first embodiment.
Figure 12:
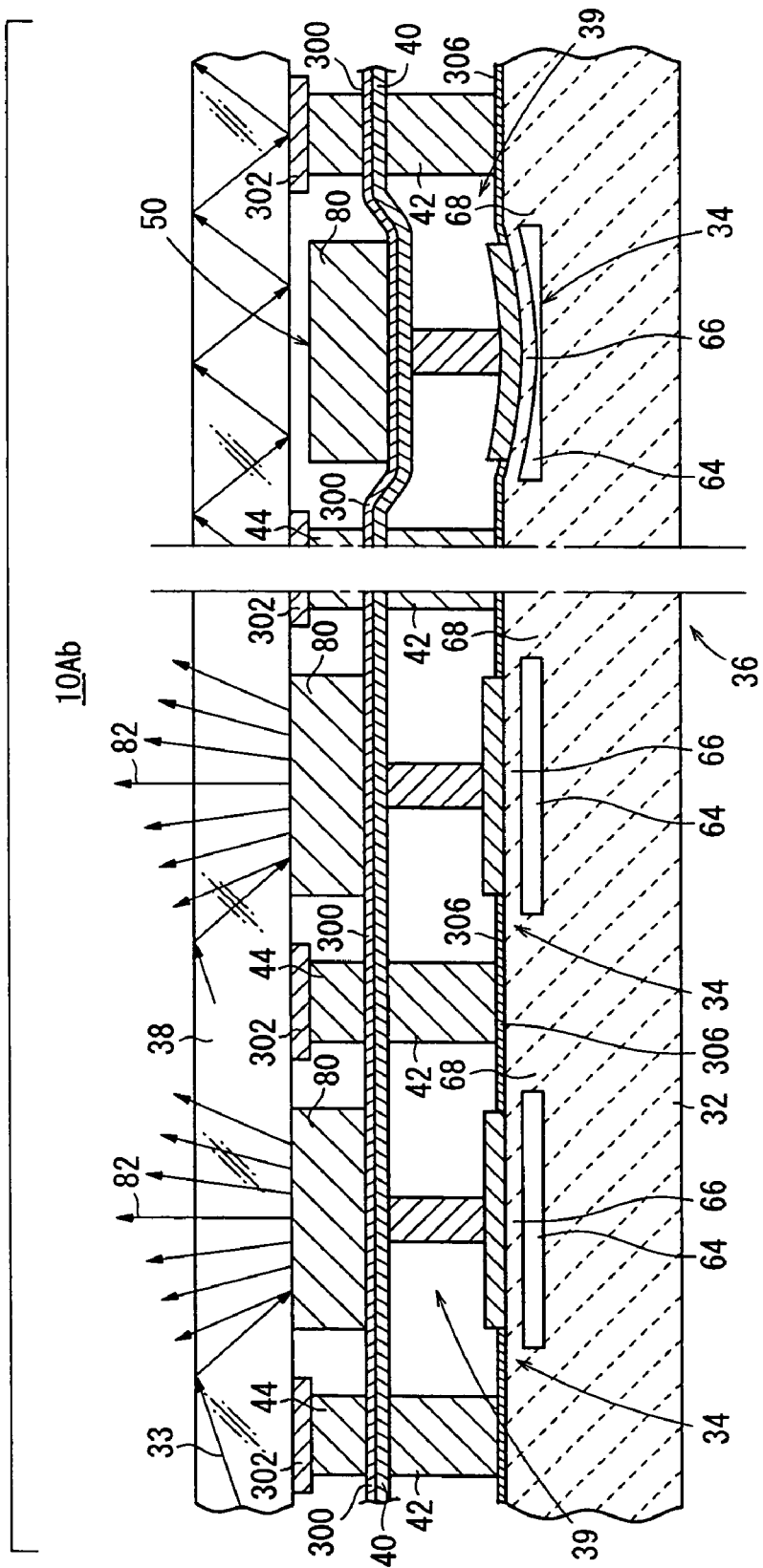
FIG. 12 is a fragmentary cross-sectional view of the second modification of the illuminating device according to the first embodiment.

In the above embodiment, each light emission zone 50 has six actuators 34 arranged in two rows and three columns. An illuminating device 10Ab for use in a display device according to a second modification is shown in FIGS. 11 and 12. The illuminating device 10Ab has a single actuator 34 disposed centrally in each of the light emission zones 50. With this arrangement, the light emission zones 50 are spaced at a smaller pitch, and the liquid crystal panel 12 can be controlled to provide backlighting for each pixel or each set of several pixels.

Since the aperture ratio of the illuminating device is determined by the area of contact of each light scattering layer 80 on the joint plate 40, the aperture ratio is not reduced even if one actuator 34 is disposed in each of the light emission zones 50. This aperture ratio principle also holds true for a structure in which two or more actuators 34 are disposed in each of the light emission zones 50.

In the above embodiment, the light reflecting layer 300 is disposed on an upper surface of the joint plate 40.

Alternatively, the light reflecting layer 300 may be dispensed with, and the joint plate 40 itself may provide a light reflecting function. According to this alternative, the joint plate 40 comprises a metal plate with its upper surface finished into a mirror surface.

Figure 10:
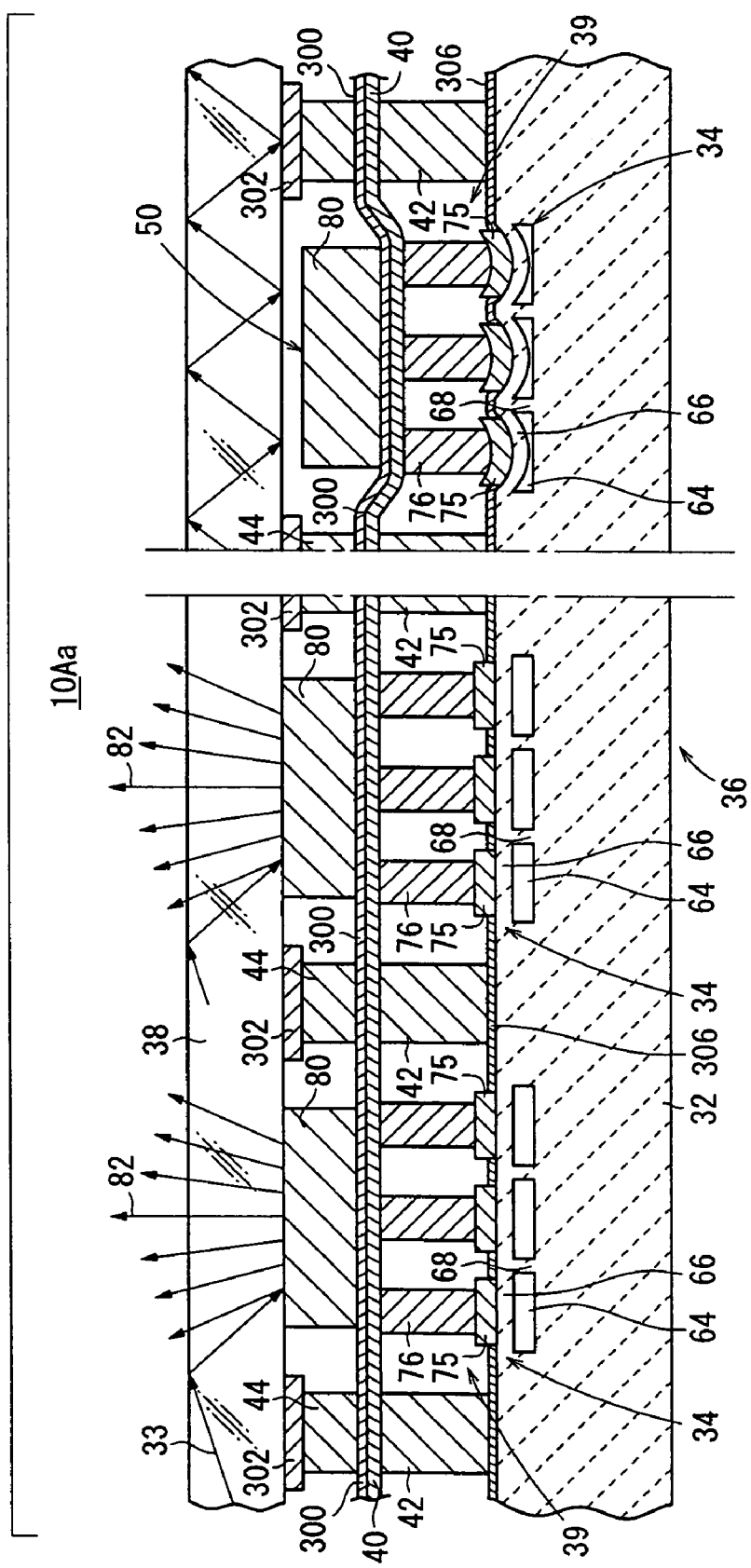
FIG. 10 is a fragmentary cross-sectional view of a first modification of the illuminating device according to the first embodiment.

An illuminating device 10B for use in a display device according to a second embodiment will be described below with reference to FIG. 13. Those parts of the illuminating device 10B that correspond to those of the illuminating device shown in FIG. 10 are denoted by identical reference characters, and shall not be described in detail below.

Figure 13:
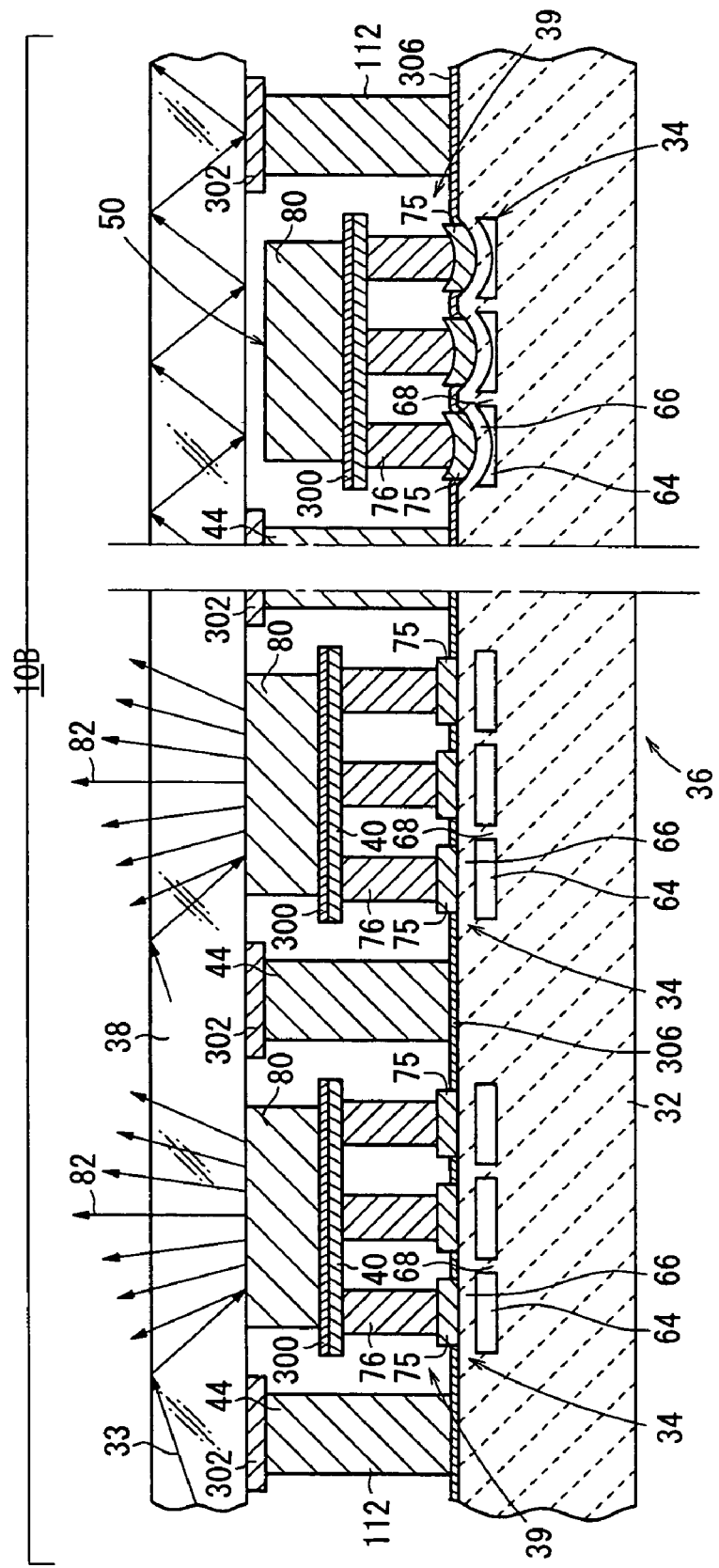
FIG. 13 is a fragmentary cross-sectional view of an illuminating device according to a second embodiment of the present invention.

As shown in FIG. 13, the illuminating device 10B according to the second embodiment is substantially of the same structure as the illuminating device 10Aa according to the first modification of the first embodiment, but differs in that the joint plate 40 is divided into segments corresponding to the light emission zones 50. More specifically, a plurality of joint plates 40 are arranged in a plane between the optical waveguide plate 38 and the actuator substrate 32.

Therefore, a plurality of spacers 112 are formed between the optical waveguide plate 38 and the actuator substrate 32, and are interposed between the optical waveguide plate 38 and the actuator substrate 32 through gaps between adjacent joint plates 40. Light reflecting layers 302 are also disposed between the spacers 112 and the optical waveguide plate 38.

In the illuminating device 10B according to the second embodiment, since the joint plate 40 is divided into segments corresponding to the light emission zones 50, the tension of adjacent joint plates 40 and the spacers 112 does not interfere with the joint plates 40 when they are displaced.

Figure 14:
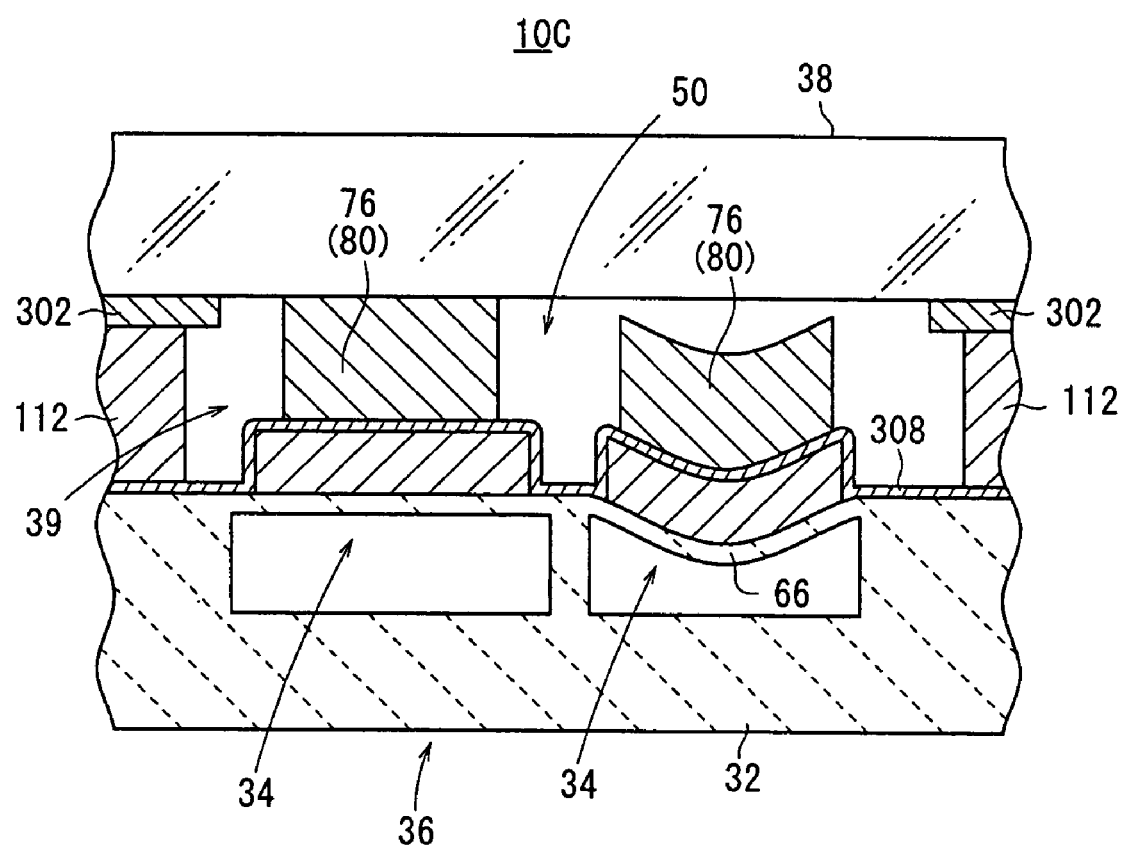
FIG. 14 is a fragmentary cross-sectional view of an illuminating device according to a third embodiment of the present invention.

An illuminating device 10C for use in a display device according to a third embodiment will be described below with reference to FIG. 14. Those parts of the illuminating device 10C that correspond to those of the illuminating device shown in FIG. 13 are denoted by identical reference characters, and shall not be described in detail below.

As shown in FIG. 13, the illuminating device 10C according to the third embodiment is of substantially the same structure as the display device 10B according to the second embodiment, but differs in that the joint plate 40 is dispensed with, and the displacement transmitters 76 of the displacement transmitter assembly 39 are constructed as light scattering layers 80, wherein a light reflecting layer 308 is disposed on the actuators 34 and on the actuator substrate 32.

When the actuators 34 are displaced, the displacement transmitters 76 are brought into direct contact with the optical waveguide plate 38.

According to the third embodiment, since the joint plate 40 and the light scattering layers 80 on the joint plate 40 are dispensed with, the illuminating device 10C can be made lower in profile.

The illuminating devices 10A through 10C according to the first through third embodiments employ an actuator substrate 32. Alternatively, the illuminating device according to the present invention does not require the actuator substrate 32.

An illuminating device 10D for use in an actuator device according to a fourth embodiment, which is free of the actuator substrate 32, will be described below with reference to FIG. 15.

Figure 15:
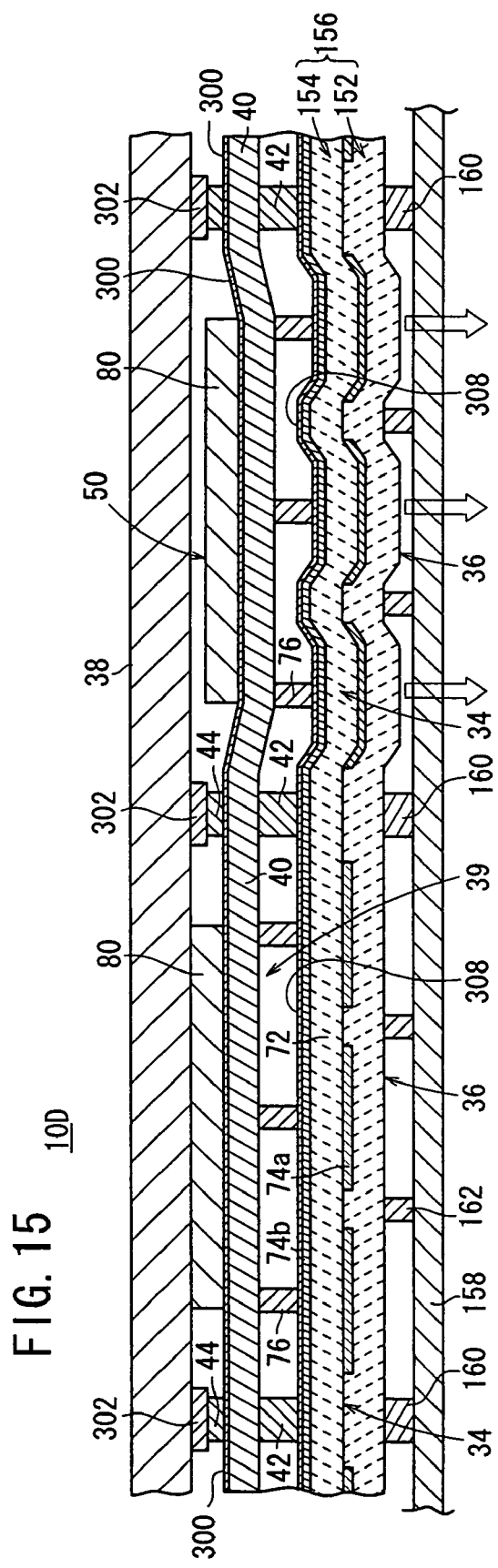
FIG. 15 is a fragmentary cross-sectional view of an illuminating device according to a fourth embodiment of the present invention.

As shown in FIG. 15, the illuminating device 10D for use in the display device according to the fourth embodiment comprises a laminated assembly 156 made up of a vibrating plate layer 152 and a piezoelectric functional layer 154, instead of the substrate 32.

The piezoelectric functional layer 154 has a plurality of lower electrodes 74a disposed on the vibrating plate layer 152, a piezoelectric/electrostrictive layer 72 disposed over the entire surface of the vibrating plate layer 152 including the lower electrodes 74a, and a plurality of upper electrodes 74b disposed on the piezoelectric/electrostrictive layer 72. The laminated assembly 156 comprises a structure, including an array of actuators 34, so that the laminated assembly 156 serves as a drive assembly 36 by itself. The vibrating plate layer 152 may be made of the same material as the piezoelectric/electrostrictive layer 72 of the piezoelectric function layer 154, or may be made of a material having different components. The laminated assembly 156 may be produced by laminating ceramic green sheets. The upper electrodes 74b and the lower electrodes 74a may easily be formed by a screen printing process or the like.

The upper electrodes 74b of the laminated assembly 156 have an electrode pattern divided into segments corresponding to respective light emission zones 50, or an electrode pattern divided into segments corresponding to respective rows. The lower electrodes 74a have an electrode pattern divided into segments corresponding to the respective actuators 34. The electrodes 74a, 74b may further be switched around vertically.

The illuminating device 10D for use in the actuator device according to the fourth embodiment comprises a drive assembly 36, an optical waveguide plate 38 disposed in confronting relation to the drive assembly 36, and a displacement transmitter assembly 39 disposed between the drive assembly 36 and the optical waveguide 38. The displacement transmitter assembly 39 includes a plurality of displacement transmitters 76 interposed between the actuators 34 and the joint plate 40.

First spacers 42 are disposed between the actuator substrate 32 and the joint plate 40, and second spacers 44 are disposed between the joint plate 40 and the optical waveguide plate 38. The illuminating device 10D also has a light reflecting layer 300 disposed over the entire upper surface of the joint plate 40, light reflecting layers 302 disposed between the second spacers 44 and the optical waveguide plate 38, and light scattering layers 80 disposed at positions on the upper surface of the light reflecting layer 300, each of which correspond to the respective light emission zones 50. A light reflecting layer 308 is disposed over the entire surface of the piezoelectric functional layer 154 including the upper electrodes 74b of the drive assembly 36. If the upper electrodes 74b are united and provided as a common electrode with respect to the lower electrodes 74a, then the upper electrode 74b may be disposed over the entire surface of the piezoelectric functional layer 154, so as to double as the light reflecting layer 308. In this case, formation of the light reflecting layer 308 on the upper electrode 74b may be dispensed with.

The laminated assembly 156 is disposed on a stationary plate 158, with a plurality of third and fourth spacers 160, 162 interposed therebetween. The third and fourth spacers 160, 162 on the stationary plate 158 include a plurality of third spacers 160 positioned in alignment with the respective first spacers 42 that are disposed between the joint plate 40 and the laminated assembly 156, and a plurality of fourth spacers 162 positioned in portions of the respective light emission zones 50 excluding the actuators 34.

With the illuminating device 10D for use in the actuator device according to the fourth embodiment, since portions of the vibrating plate layer 152, which are not positioned in alignment with the actuators 34, are fixed by the third and fourth spacers 160, 162 disposed on the stationary plate 158, spaces surrounded by the stationary plate 158, the third and fourth spacers 160, 162, and the vibrating plate layer 152 perform essentially the same functions as the cavities 64 defined in the actuator substrate 32 shown in FIG. 2, and thereby can easily determine the direction in which the actuators 34 are displaced.

Since the laminated assembly 156 is supported on the stationary plate 158 by the third and fourth spacers 160, 162, crosstalk (interdependent displacement) between the actuators 34 and also between the light emission zones 50 is reduced, while responsiveness of the switching action (displacement of the joint plate 40) is increased. The stationary plate 158 thus is effective to increase the mechanical strength of the illuminating device 10D itself, increasing ease of handling when it is being transported or manufactured.

A plurality of piezoelectric functional layers 154 may be stacked into a laminated structure for increasing the amount of displacement of each of the actuators 34 as well as the force generated by each of the actuators 34. Desired patterns of displacement for the actuators 34 can be obtained simply by changing the positions where the spacers 42, 44, 160, 162 are located, and also by changing the electrode patterns of the upper electrodes 74b and the lower electrodes 74a.

A modification of the illuminating device 10D for use in the display device according to the fourth embodiment will be described below with reference to FIGS. 16 through 17B.

Figure 16:
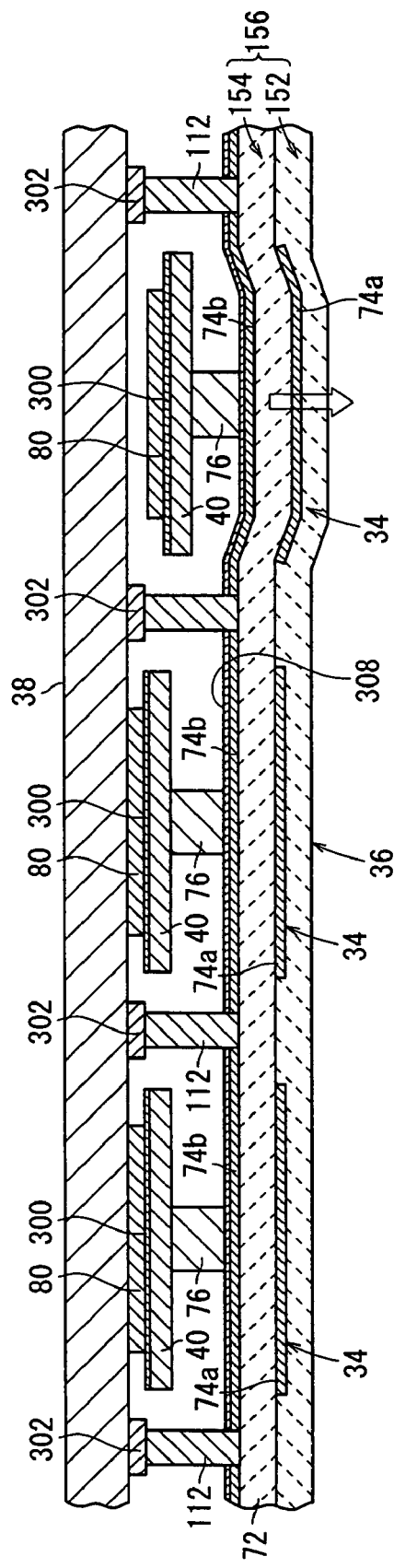
FIG. 16 is a fragmentary cross-sectional view of a modification of the illuminating device according to the fourth embodiment.

As shown in FIG. 16, a modified illuminating device 10Da is of substantially the same structure as the illuminating device 10D according to the fifth embodiment, except that it lacks the stationary plate 158 and the third and fourth spacers 160, 162. Further, separate joint plates 40 are associated with the respective light emission zones 50, and actuators 34 are disposed in respective positions at the centers of the light emission zones 50.

The joint plates 40 are disposed flatly between the optical waveguide plate 38 and the laminated assembly 156, and one actuator 34 is assigned to each of the joint plates 40. A plurality of spacers 112 is interposed between the optical waveguide plate 38 and the laminated assembly 156 through gaps formed between adjacent joint plates 40.

Light reflecting layers 300 are disposed over the entire upper surfaces of the respective joint plates 40, and light reflecting layers 302 are disposed between the spacers 112 and the optical waveguide plate 38. Light reflecting layers 308 are also disposed on the upper electrodes 74b of the drive assembly 36. The upper electrodes 74b may double as light reflecting layers 308.

With the modified illuminating device 10Da, since portions of the laminated assembly 156, which are not positionally aligned with the actuators 34, are fixed by spacers 112 disposed between the joint plates 40 and the laminated assembly 156, spaces surrounded by the optical waveguide plate 38, the spacers 112, and the laminated assembly 156 perform essentially the same function as the cavities 64 defined in the actuator substrate 32 shown in FIG. 2, and can thereby easily determine the direction in which the actuators 34 are displaced. In particular, the illuminating device 10Da is of a lower profile since it lacks the stationary plate 158.

Figure 17A:
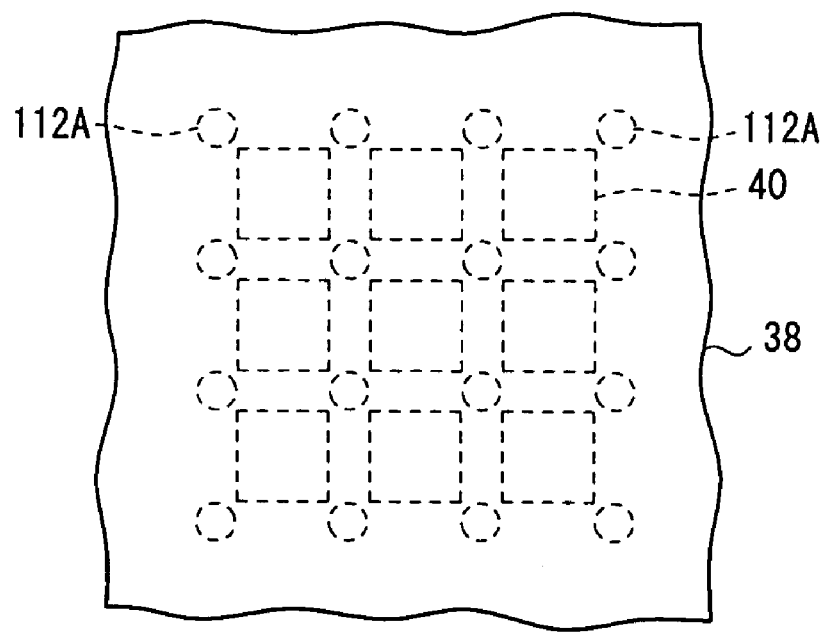
FIG. 17A is a view showing a layout of spacers.
Figure 17B:
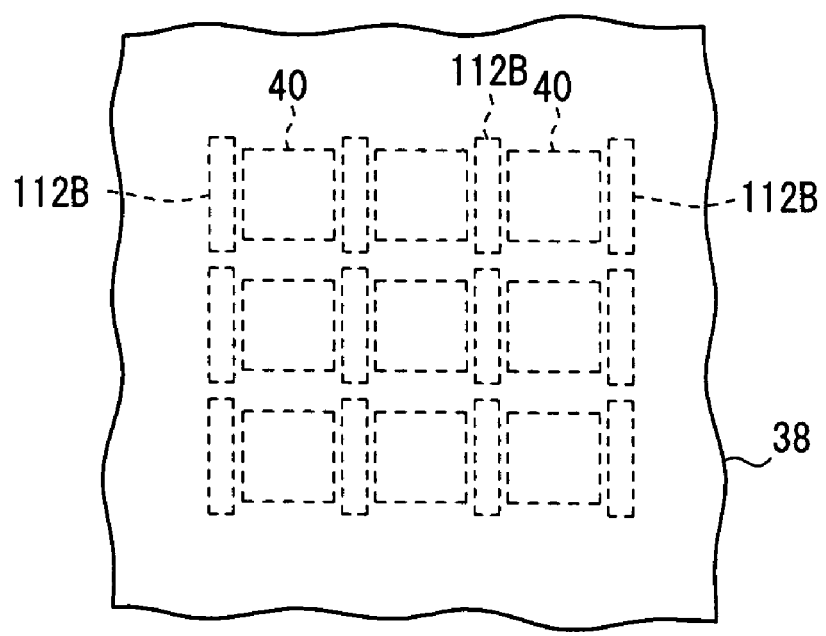
FIG. 17B is a view showing another layout of spacers.

As shown in FIG. 17A, the spacers 112 may comprise cylindrical spacers 112A, for example, positioned closely to corners of the joint plates 40. Alternatively, as shown in FIG. 17B, the spacers 112 may comprise spacers 112B having an elongate rectangular cross section disposed adjacent to the joint plates 40.

An illuminating device 10E for use in a display device according to a fifth embodiment of the present invention will be described below with reference to FIG. 18.

The illuminating device 10E for use in the display device according to the fifth embodiment comprises a drive assembly 36, which employs a laminated assembly 354 of two piezoelectric functional layers (first and second piezoelectric functional layers 350, 352).

The first piezoelectric functional layer 350 comprises a piezoelectric/electrostrictive layer 72a, a common electrode 74c disposed on an upper surface of the piezoelectric/electrostrictive layer 72a, and lower electrodes 74a disposed on the lower surface of the piezoelectric/electrostrictive layer 72a. The second piezoelectric functional layer 352 comprises a piezoelectric/electrostrictive layer 72b, a common electrode 74c disposed on the lower surface of the piezoelectric/electrostrictive layer 72b, and upper electrodes 74b disposed on the upper surface of the piezoelectric/electrostrictive layer 72b.

The common electrodes 74c in the laminated assembly 354 have electrode patterns that are either commonly formed over the entire surface or separately formed in association with respective rows, and the lower and upper electrodes 74a, 74b have electrode patterns that are separately formed in association with the respective actuators 34. In the illustrated embodiment, a plurality of actuators 34 are arrayed in each of the light emission zones 50.

Displacement transmitters 76 are mounted on upper surface portions of the laminated assembly 354, which correspond respectively to the light emission zones 50, by a bonding layer 358 which may be either transparent or non-transparent. A light reflecting layer 300 is disposed on the displacement transmitters 76 and the laminated assembly 354 (or the bonding layer 358). A light scattering layer 80 is mounted over the entire surface of the light reflecting layer 300 by a transparent bonding layer 360. The bonding layer 358 may double as the displacement transmitters 76.

Spacers 362 are disposed on portions of the light scattering layer 80 which correspond to boundaries of the light emission zones 50. Each of the spacers 362 has a three-layer structure made up of a transparent bonding layer 364, a light reflecting layer 366, and a bonding layer 368 which may be either transparent or non-transparent.

The thickness of the displacement transmitters 76 is greater than the thicknesses of the light scattering layer 80 and the light reflecting layer 300, so as to divide the light emission zones 50 clearly between the spacers 362 and prevent displacement-induced crosstalk between the light emission zones 50.

Operation of the illuminating device 10E for use in the display device according to the fifth embodiment will be described below.

When the actuators 34 are in their natural state, the light scattering layer 80 has its end face spaced from the optical waveguide plate 38, and light is extinguished from the principal surface of the optical waveguide plate 38.

Figure 18:
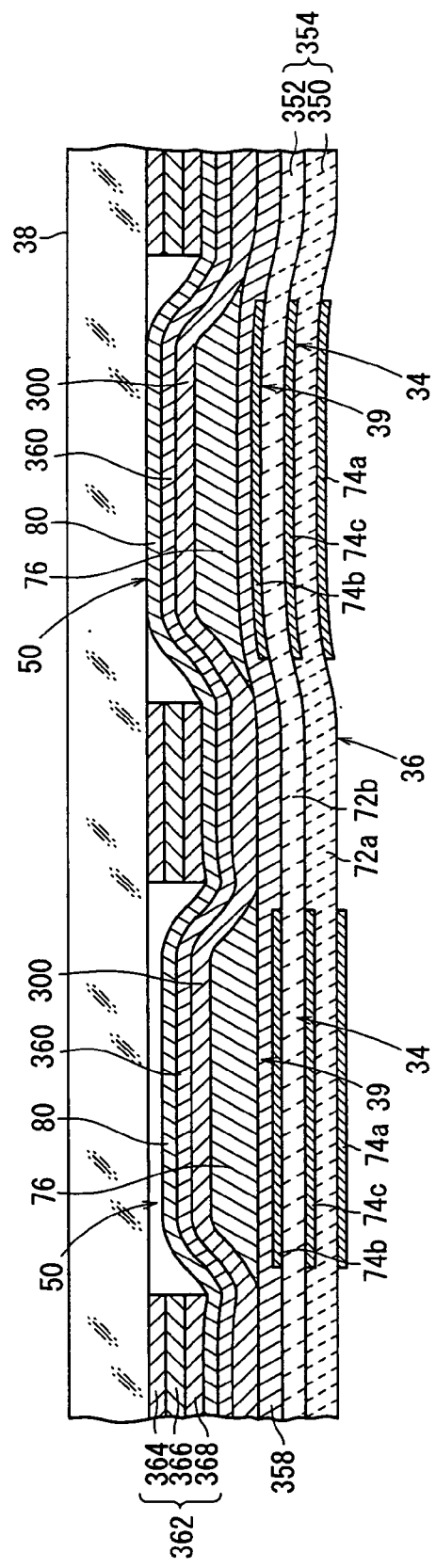
FIG. 18 is a fragmentary cross-sectional view of an illuminating device according to a fifth embodiment of the present invention.

When a positive drive voltage, e.g., a voltage of +25 V with respect to the common electrodes 74c, is applied between the upper electrode 74b and the common electrode 74c of the actuator 34 associated with a certain light emission zone 50, and a positive drive voltage, e.g., a voltage of +25 V with respect to the common electrodes 74c, is applied between the lower electrode 74a and the common electrode 74c of the actuator 34 associated with that certain light emission zone 50, the actuator 34 is displaced so as to flex convexly upward, as shown in FIG. 18. Thus the end face of the light scattering layer 80 is brought into contact with the back of the optical waveguide plate 38, at a distance equal to or smaller than the wavelength of introduced light (not shown), and light is introduced into the optical waveguide plate 38. The optical waveguide plate 38 thus emits white light, for example, from a portion corresponding to the light emission zone 50.

According to the above drive process, a positive drive voltage is applied between the common electrode 74c and the lower electrode 74a, which are positioned across the first piezoelectric functional layer 350, and a positive drive voltage is applied between the common electrode 74c and the upper electrode 74b, which are positioned across the second piezoelectric functional layer 352, thereby emitting white light, for example, from the portion of the optical waveguide plate 38 corresponding to the light emission zone 50 (first drive process). Alternatively, a positive drive voltage may be applied only between the common electrode 74c and the lower electrode 74a, which are positioned across the first piezoelectric functional layer 350 (second drive process), or a positive drive voltage may be applied only between the common electrode 74c and the upper electrode 74b, which are positioned across the second piezoelectric functional layer 352 (third drive process). The actuator 34 is displaced similarly according to the first through third drive processes. However, although the same drive voltage is applied, the first drive process produces the greatest displacement, the second drive process the second greatest displacement, and the third drive process the smallest displacement. Consequently, the first drive process or the second drive process may be employed to drive the actuator 34 at a lower voltage.

A drive voltage of opposite polarity, i.e., a voltage of −25 V with respect to the common electrodes 74c, may be applied between the common electrode 74c and the lower electrode 74a and/or between the common electrode 74c and the upper electrode 74b. Alternatively, the first and second piezoelectric functional layers 350, 352 may be polarized in different directions, or different voltages may be applied across the first and second piezoelectric functional layers 350, 352. The actuator 34 associated with the light emission zone 50 in question may be displaced so as to flex convexly downward. The direction of flexural displacement of the actuator 34 may be changed by adjusting the distance between ends of the lower electrode 74a, the upper electrode 74b, and the common electrode 74c, and the end faces of the spacers 362.

A modification of the illuminating device 10E for use in the display device according to the fifth embodiment will be described below with reference to FIG. 19.

Figure 19:
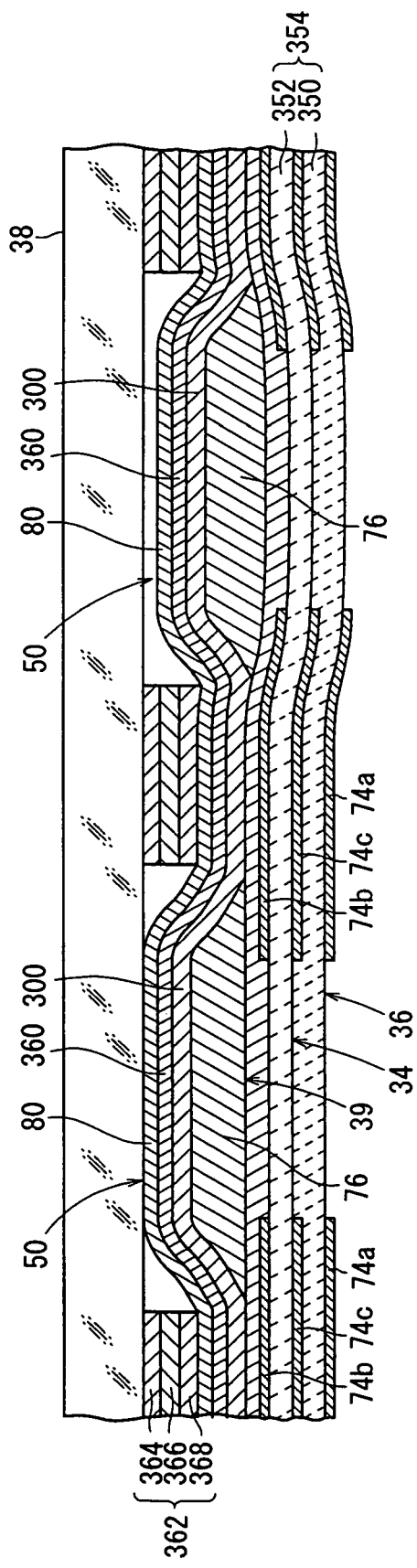
FIG. 19 is a fragmentary cross-sectional view of a modification of the illuminating device according to the fifth embodiment.

As shown in FIG. 19, a modified illuminating device 10Ea differs from the illuminating device 10E in that it has common electrodes 74c, upper electrodes 74b, and lower electrodes 74a, which are disposed in portions corresponding to the respective spacers 362. When a positive drive voltage, e.g., a voltage of +25 V with respect to the common electrodes 74c, is applied between the upper electrode 74b and the common electrode 74c positioned around a certain light emission zone 50, and a positive drive voltage is applied between the lower electrode 74a and the common electrode 74c positioned around the same light emission zone 50, the portion around the light emission zone 50 tends to be displaced, so as to flex convexly toward the optical waveguide plate 38. However, since such flexural displacement is suppressed by the spacers 362 and the optical waveguide plate 38, energy is transmitted to the portion of the laminated assembly 354 corresponding to the light emission zone 50. As shown in FIG. 19, this portion is displaced so as to be flex convexly downward, extinguishing light from the light emission zone 50.

According to the above drive process, a positive drive voltage is applied between the common electrode 74c and the lower electrode 74a, which are positioned across the first piezoelectric function layer 350, while a positive drive voltage is applied between the common electrode 74c and the upper electrode 74b, which are positioned across the second piezoelectric functional layer 352, thereby extinguishing light from the portion of the optical waveguide plate 38 corresponding to the light emission zone 50 (fourth drive process). Alternatively, a positive drive voltage may be applied only between the common electrode 74c and the lower electrode 74a, which are positioned across the first piezoelectric functional layer 350 (fifth drive process), or a positive drive voltage may be applied only between the common electrode 74c and the upper electrode 74b, which are positioned across the second piezoelectric function layer 352 (sixth drive process). The actuator 34 is displaced similarly according to the fourth through sixth drive processes. However, although the same drive voltage is applied, the fourth drive process produces the greatest displacement, the fifth drive process the second greatest displacement, and the sixth drive process the smallest displacement. Consequently, the fourth drive process or the fifth drive process may be employed to drive the actuator 34 at a lower voltage.

A drive voltage of opposite polarity, i.e., a voltage of −25 V with respect to the common electrodes 74c, may be applied between the upper electrode 74b and the common electrode 74c, and/or between the lower electrode 74a and the common electrode 74c. Alternatively, the first and second piezoelectric functional layers 350, 352 may be polarized in different directions, or different voltages may be applied across the first and second piezoelectric functional layers 350, 352. The actuator 34 associated with the light emission zone 50 in question may be displaced so as to flex convexly upward, i.e., the actuator 34 may be displaced to press the light scattering layer 80 more strongly against the optical waveguide plate 38. The direction of flexural displacement of the actuator 34 may be changed by adjusting the distance between ends of the lower electrode 74a, the upper electrode 74b, and the common electrode 74c, and the end faces of the spacers 362.

According to the fifth embodiment and its modification, since the drive voltage is applied with respect to the common electrodes 74c, the drive voltage can be lowered, thereby allowing the illuminating devices 10E, 10Ea for use in display devices to consume less electric power.

An illuminating device 10F according to a sixth embodiment of the present invention will be described below with reference to FIGS. 20 through 24.

Figure 20:
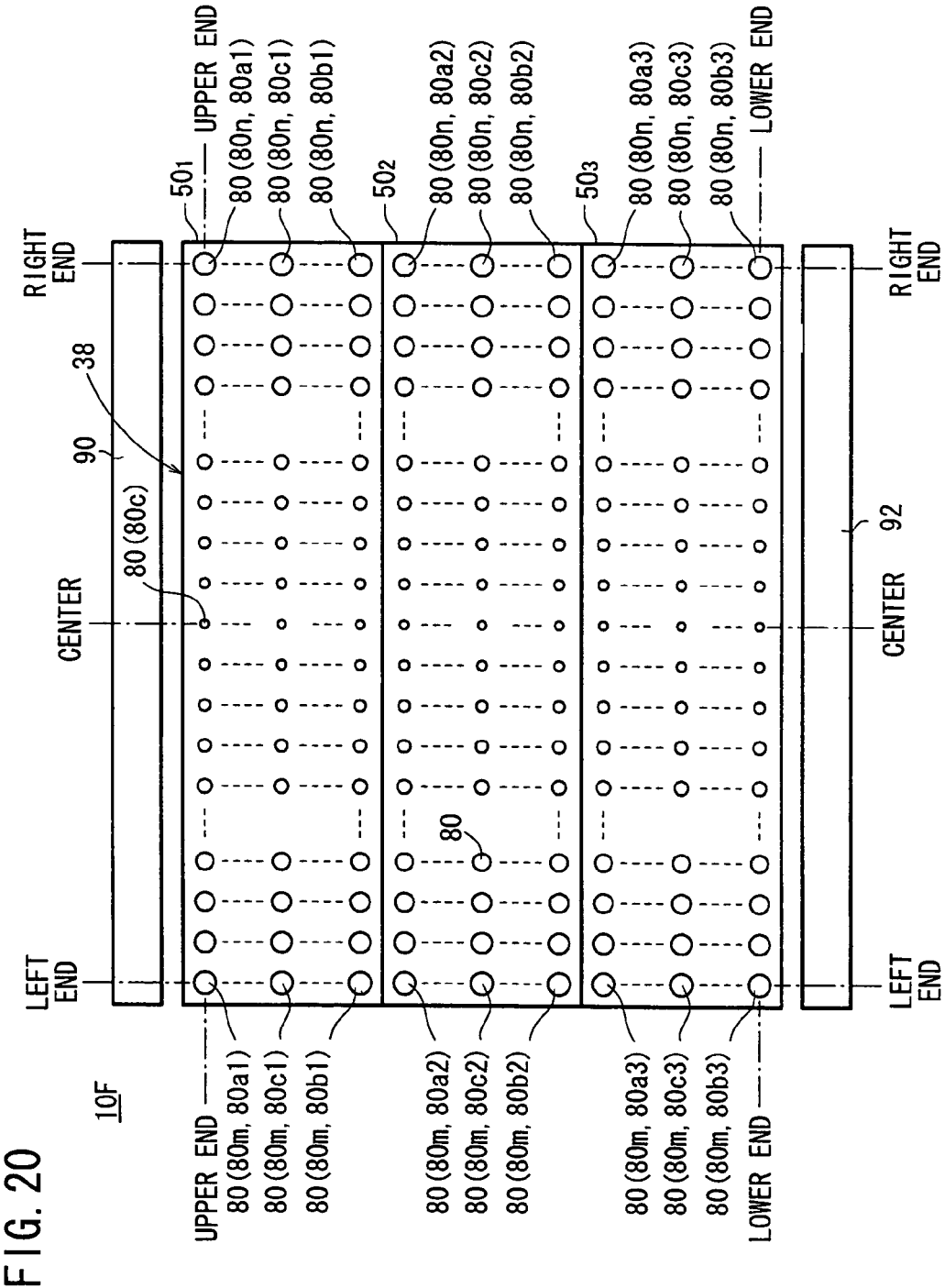
FIG. 20 is a view of an illuminating device according to a sixth embodiment of the present invention, showing in particular a layout of first and second light sources, an optical waveguide plate, and light diffusion layers.

The illuminating device 10F according to the sixth embodiment is of essentially the same structure as either one of the illuminating devices 10A through 10E according to the first through fifth embodiments. However, the illuminating device 10F differs in that, as shown in FIG. 20, three light emission zones $50_1$, $50_2$, $50_3$, for example, are arranged in a vertical array, and a plurality of light scattering layers 80 are assigned to the light emission zones $50_1$, $50_2$, $50_3$. The light scattering layers 80 have end faces with areas (areas where the light scattering layers 80 contact the back of the optical waveguide plate 38, hereinafter referred to as "dot areas") that are different depending on their positions. In the illustrated embodiment, the light emission zones $50_1$, $50_2$, $50_3$ are controlled so as to emit light at successively shifted times.

Since the front surface of the optical waveguide plate 38 emits light when the light scattering layers 80 are brought into contact with the optical waveguide plate 38, the areas where the light scattering layers 80 contact the back of the optical waveguide plate 38, i.e., the dot areas, essentially serve as light emission areas.

Specific details of the illuminating device 10F according to the sixth embodiment will be described below with reference to FIGS. 20 through 24. A first light source 90 is disposed in facing relation to an upper end face of the optical waveguide plate 38, and a second light source 92 is disposed in facing relation to a lower end face of the illuminating device 10F.

Among the light scattering layers 80 in the light emission zones $50_1$, $50_2$, $50_3$, a plurality of light scattering layers 80 arrayed horizontally along a certain row shall be considered. Assuming that the dot area of a light scattering layer 80c positioned at the center is 100%, then the dot areas of light scattering layers 80m, 80n on the left and right sides of the central light scattering layer 80c are in the range from 110% to 170%.

When the central light scattering layer 80c and other nearby light scattering layers 80 that are horizontally arrayed are brought into contact with the optical waveguide plate 38, light comes from various directions, i.e., from central and peripheral regions of the first and second light sources 90, 92. Therefore, the luminance of light emitted from the illuminating device 10F is high.

Conversely, when the light scattering layers 80m, 80n on left and right sides of the horizontally arrayed light scattering layers 80 are brought into contact with the optical waveguide plate 38, the amount of light coming from the first and second light sources 90, 92 is smaller than when the central light scattering layer 80c and the other nearby light scattering layers 80 are brought into contact with the optical waveguide plate 38. Therefore, the luminance of light emitted from the illuminating device 10F is relatively low.

According to the sixth embodiment, assuming that the dot area of the central light scattering layer 80c is 100%, then the dot areas of the light scattering layers 80m, 80n on left and right sides of the central light scattering layer 80c are in the range from 110% to 170%.

Figure 21:
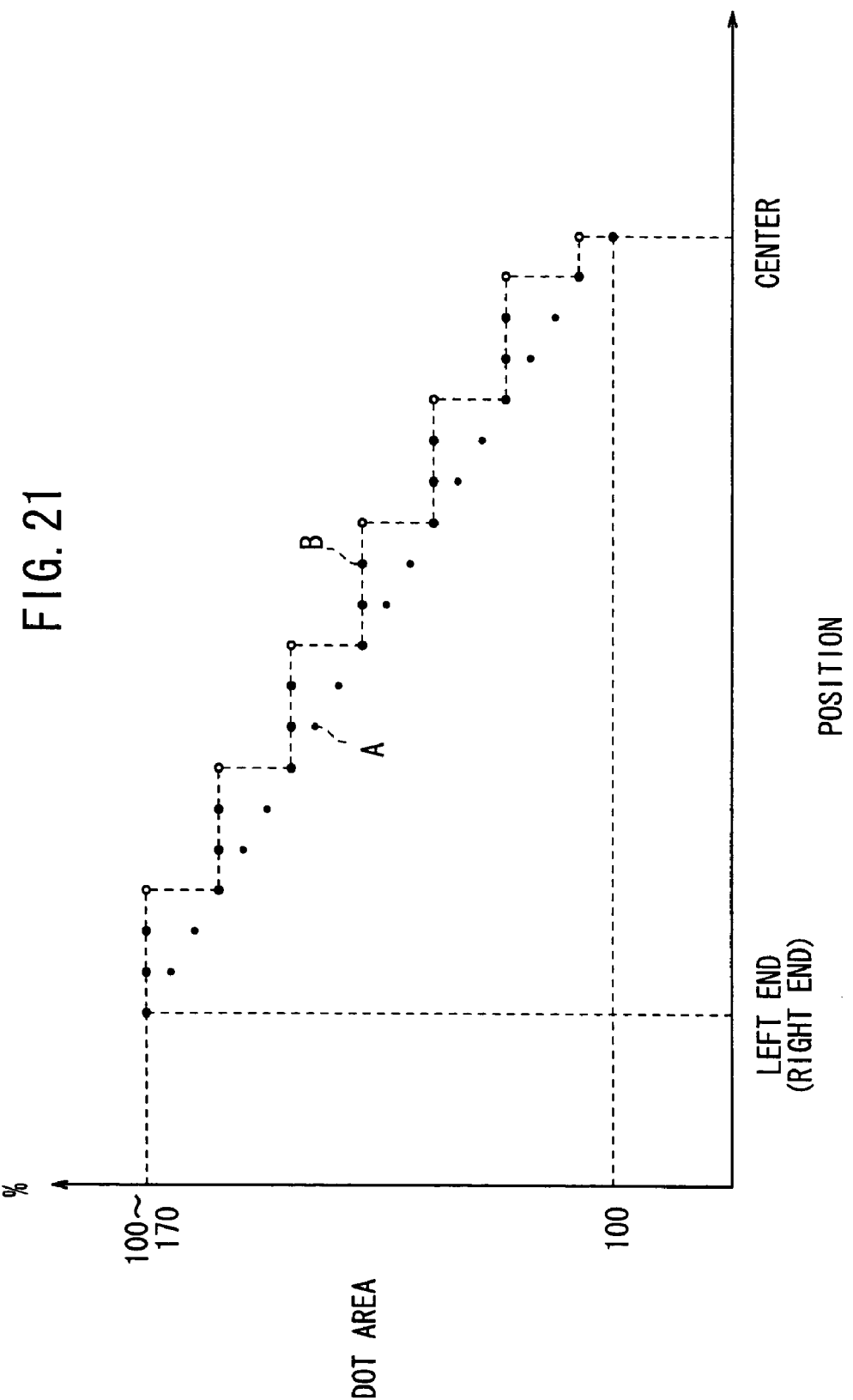
FIG. 21 is a diagram showing changes (linear and step-like patterns) of dot areas from the center of a plurality of light diffusion layers arranged in the horizontal direction toward the opposite left and right sides thereof, for the illuminating device according to the sixth embodiment.
Figure 22:
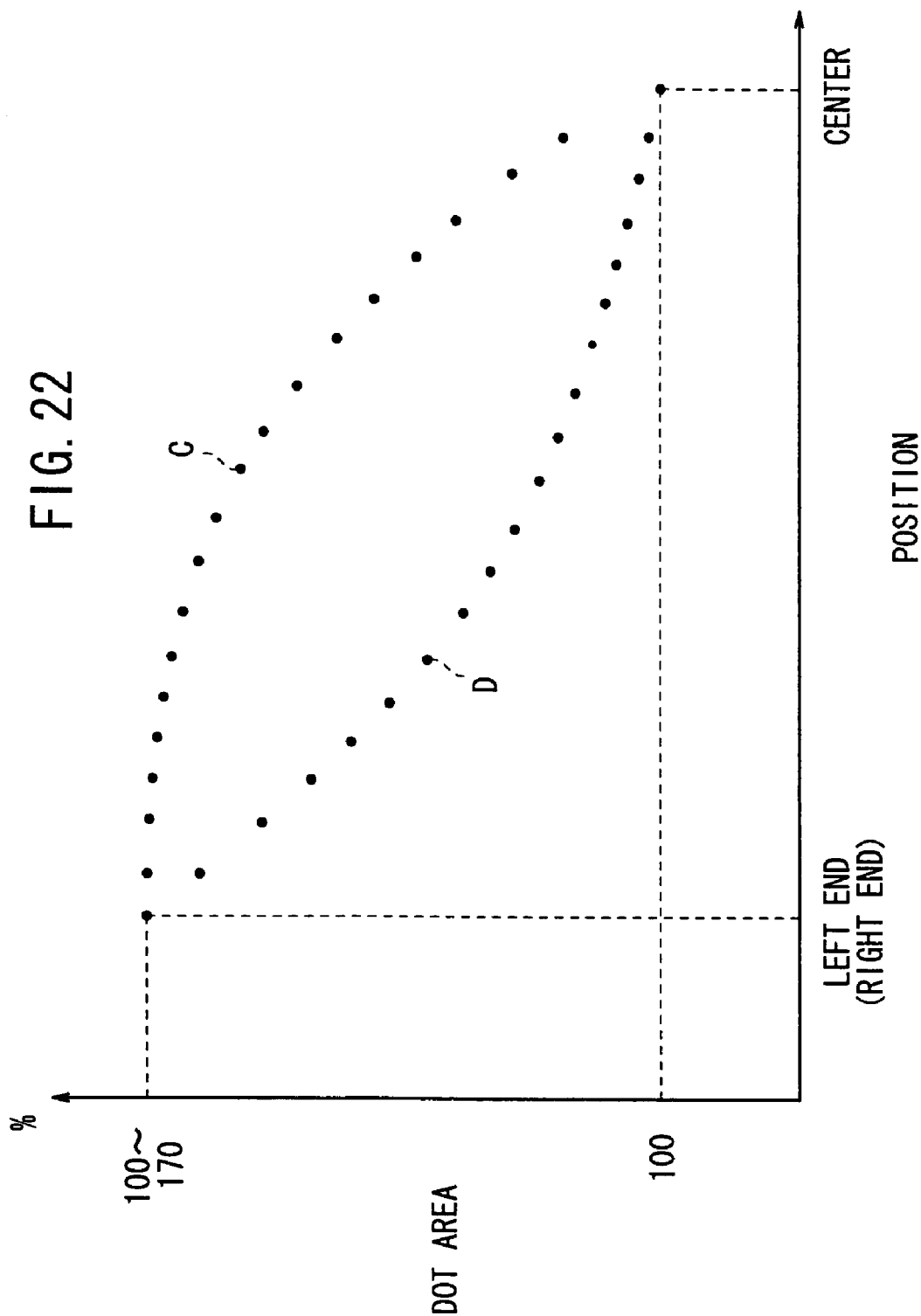
FIG. 22 is a diagram showing changes (two nonlinear patterns) of dot areas from the center of a plurality of light diffusion layers arranged in the horizontal direction toward the opposite left and right sides thereof, for the illuminating device according to the sixth embodiment.
Figure 23:
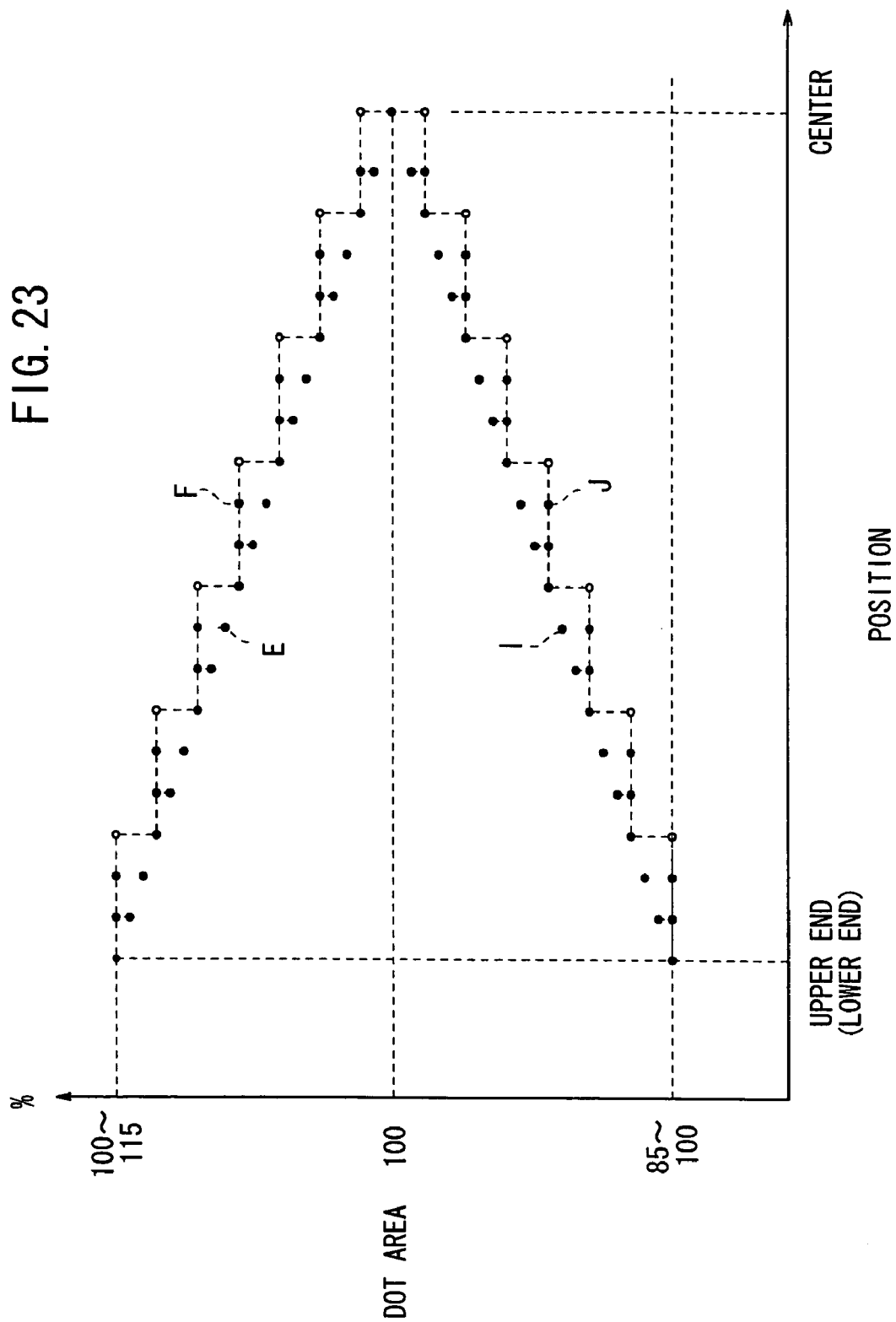
FIG. 23 is a diagram showing changes (linear and step-like patterns) of dot areas from the center of a plurality of light diffusion layers arranged in the vertical direction toward the opposite upper and lower sides thereof, for the illuminating device according to the sixth embodiment.
Figure 24:
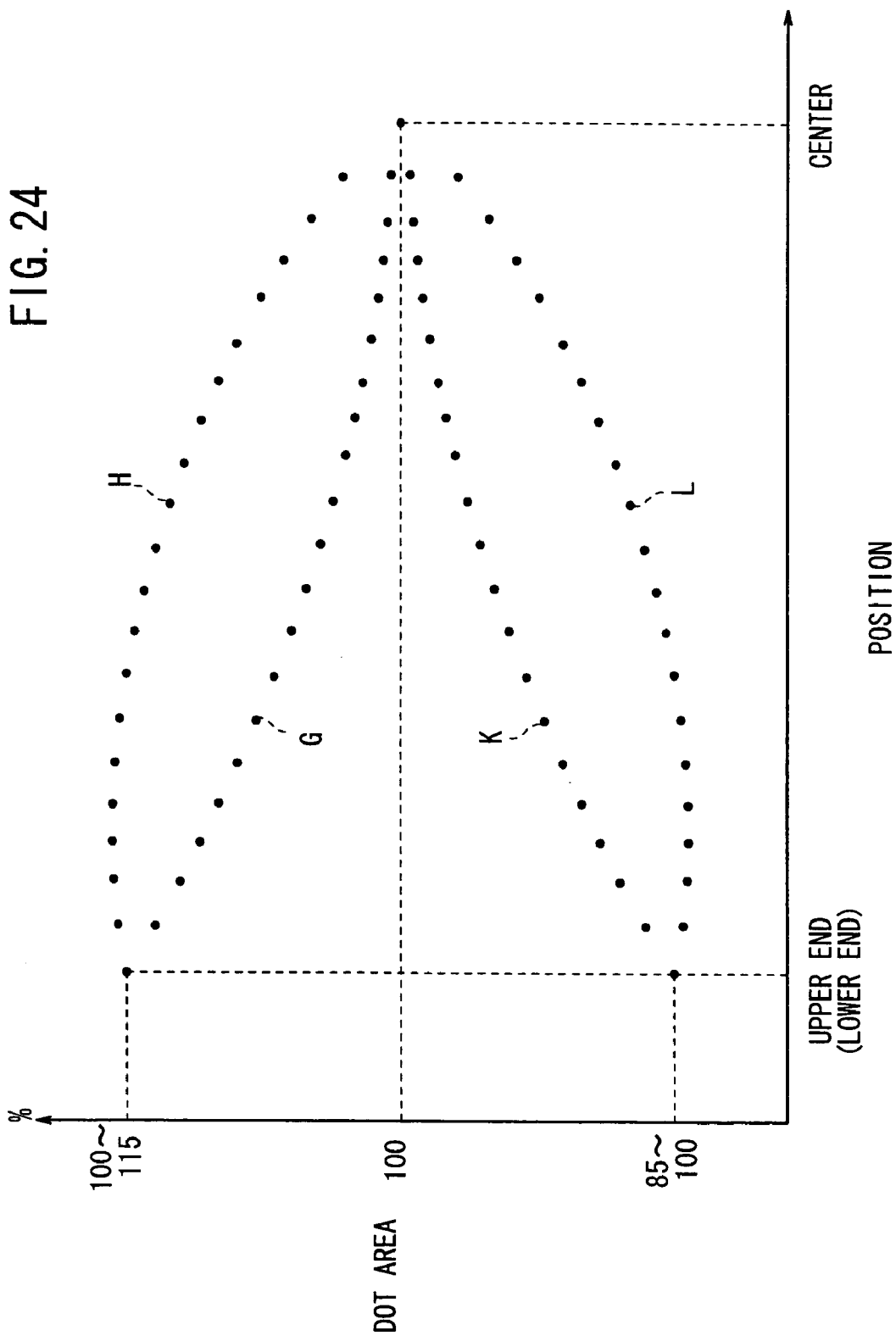
FIG. 24 is a diagram showing changes (two nonlinear patterns) of dot areas from the center of a plurality of light diffusion layers arranged in the vertical direction toward the opposite upper and lower sides thereof, for the illuminating device according to the sixth embodiment.
Figure 25:
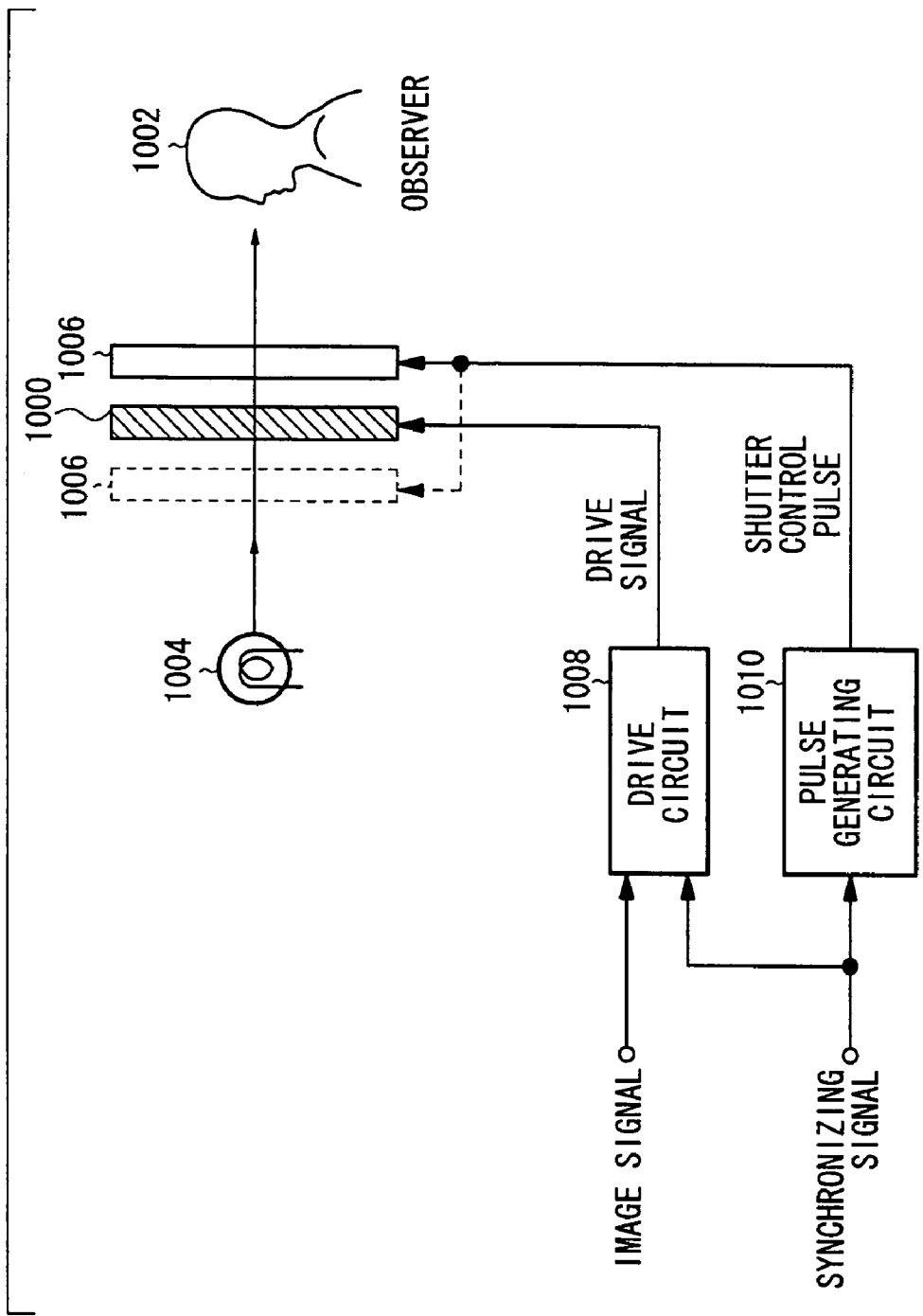
FIG. 25 is a diagram illustrative of a conventional first process.
Figure 26:
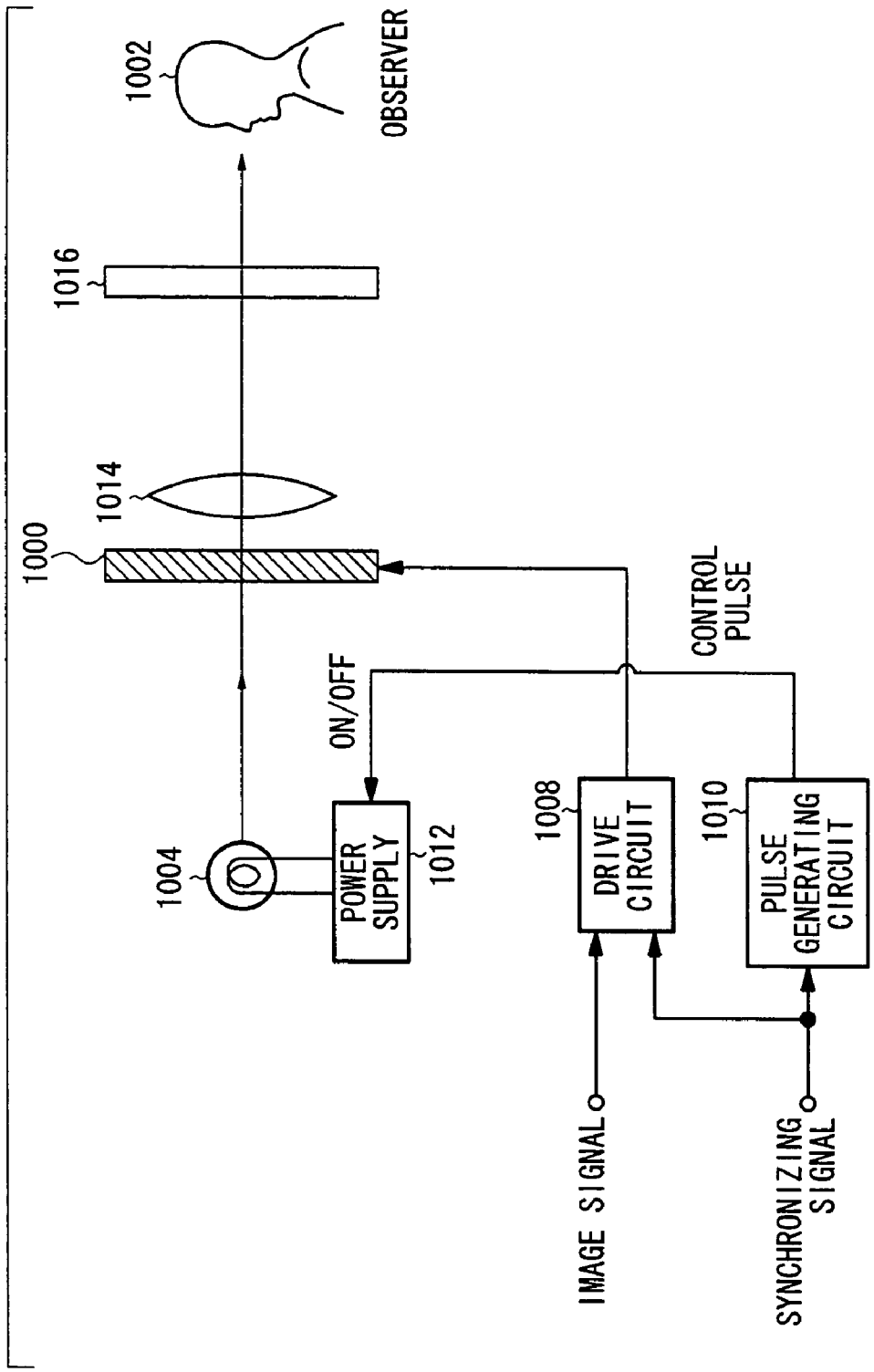
FIG. 26 is a diagram illustrative of a conventional second process.
Figure 27:
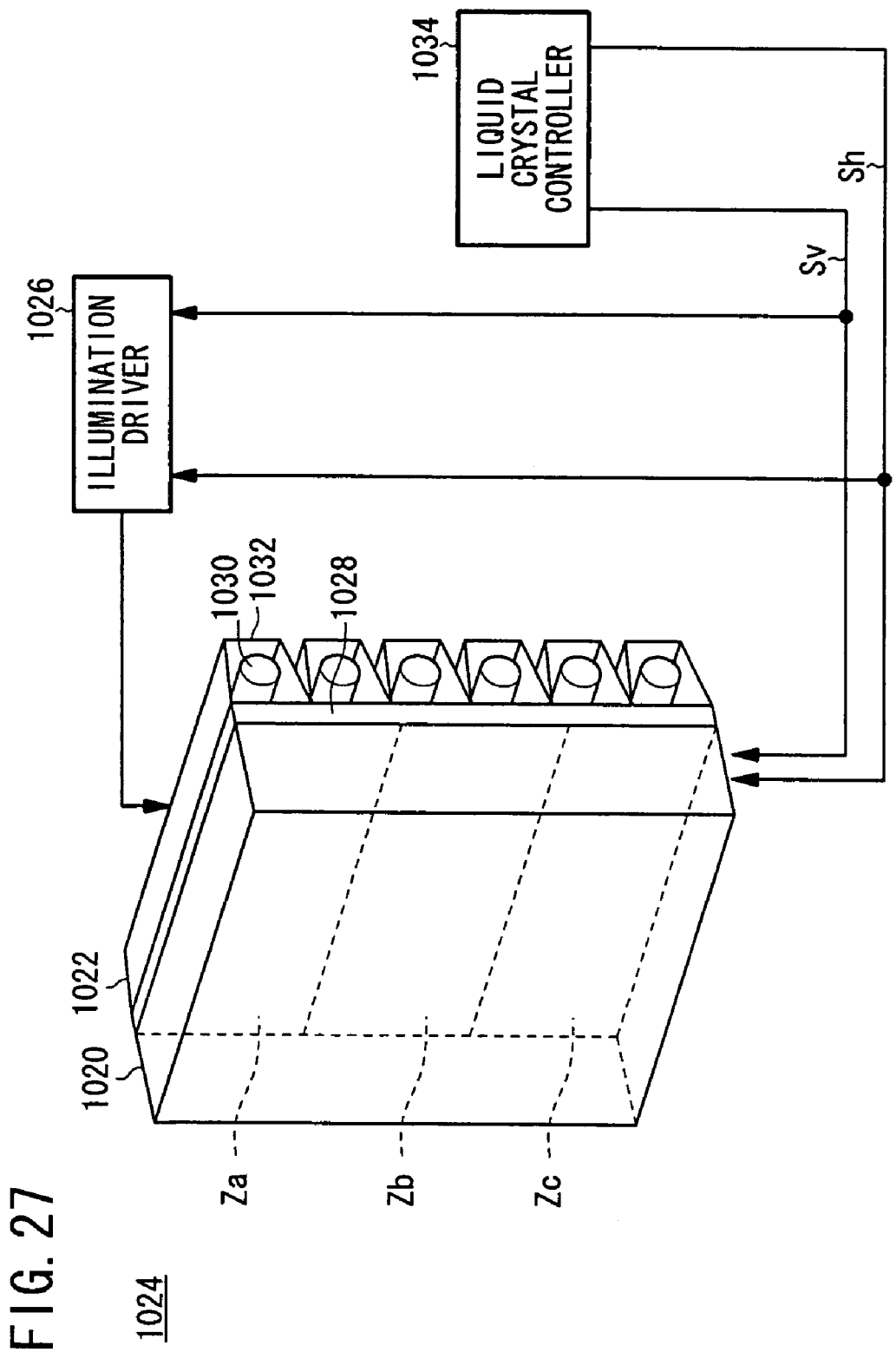
FIG. 27 is a diagram illustrative of a conventional third process.
Figure 28:
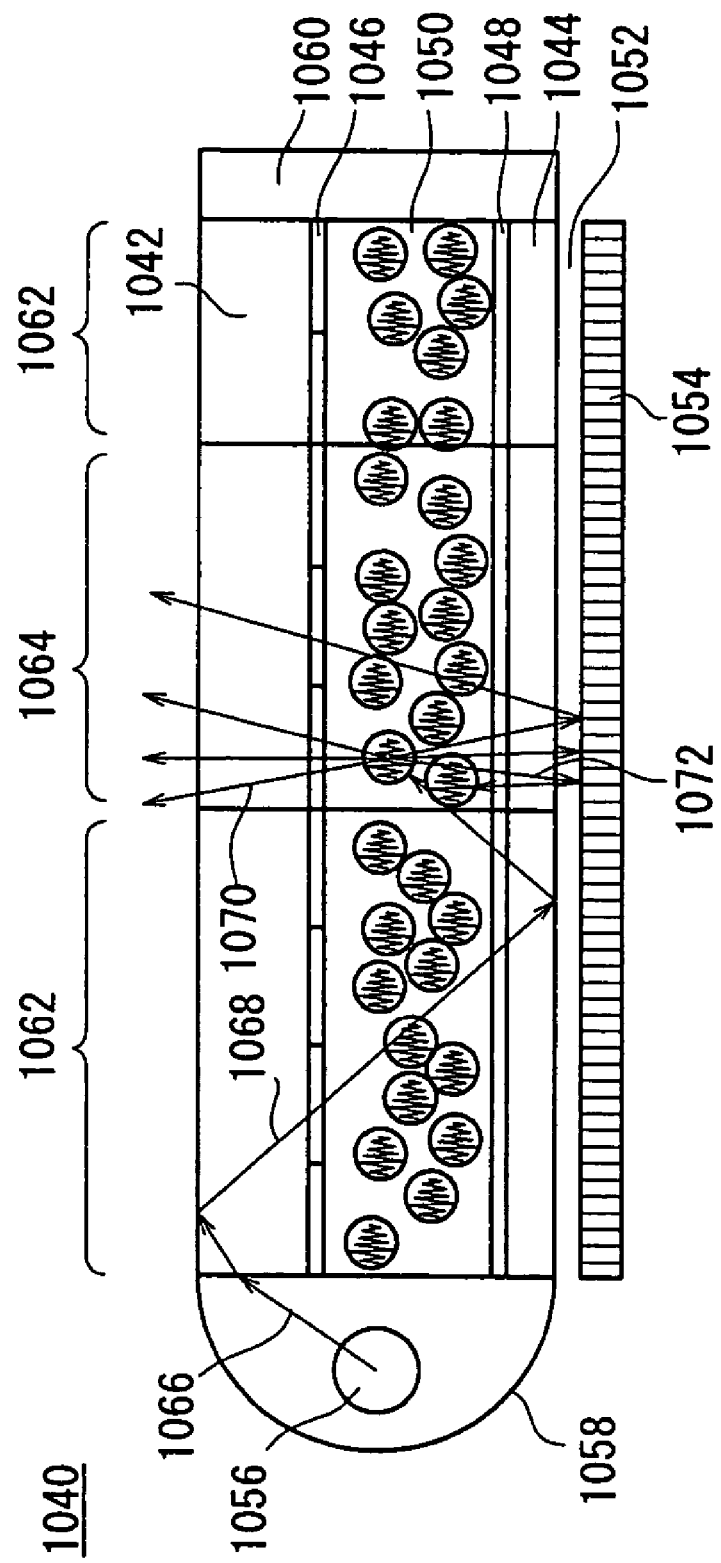
FIG. 28 is a cross-sectional view illustrative of a conventional illuminating device.
Figure 29:
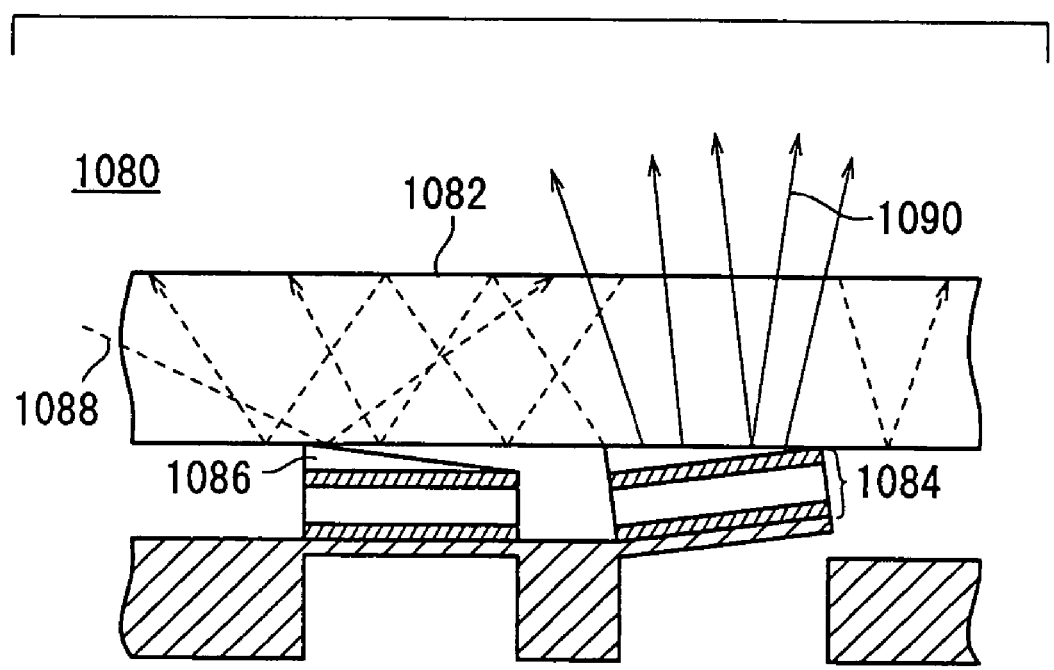
FIG. 29 is a cross-sectional view illustrative of a conventional display device.

Dot areas of the horizontally arrayed light scattering layers 80 may change from the center to the left and right sides, i.e., from 100% to the range from 110% to 170%, according to a linear pattern as indicated by the dotted line A in FIG. 21, or a step-like pattern as indicated by the dotted line B in FIG. 21. Alternatively, dot areas of the horizontally arrayed light scattering layers 80 may change according to a nonlinear pattern, e.g., a natural logarithmic pattern, as indicated by the dotted line C in FIG. 22, or another nonlinear pattern, e.g., an exponential pattern, as indicated by the dotted line D in FIG. 22.

Among the light scattering layers 80 in the light emission zones $50_1$, $50_2$, $50_3$, a plurality of light scattering layers 80 arrayed vertically along a given column shall now be considered. Assuming the dot area of light scattering layers (80a1, 80b1), (80a2, 80b2), and (80a3, 80b3) at the upper and lower ends of the light emission zones $50_1$, $50_2$, $50_3$, i.e., near the first light source 90 and the second light source 92, is 100%, then the dot areas of light scattering layers 80c1, 80c2, 80c3 disposed closely to vertical central regions of the light emission zones $50_1$, $50_2$, $50_3$ are in the range from 100% to 115%.

The amount of light that reaches the vertically central light scattering layer $80c1$ in one light emission zone, e.g., the light emission zone $50_1$, is less than the amount of light that reaches the light scattering layers $80a1$, $80b1$ close to the light sources 90, 92. This holds true as well for the other light emission zones $50_2$, $50_3$. Therefore, luminance variations can be reduced if the dot area of the light scattering layers $80c1$, $80c2$, $80c3$ near the central regions of the light emission zones $50_1$, $50_2$, $50_3$ is greater than the dot area of light scattering layers ($80a1$, $80b1$), ($80a2$, $80b2$), and ($80a3$, $80b3$) near the first light source 90 and the second light source 92 in the light emission zones $50_1$, $50_2$, $50_3$. Such an approach is effective, particularly if the vertical length of the light emission zones $50_1$, $50_2$, $50_3$ is large.

Luminance variations can also be reduced by changing the dot area, depending on the type of light sources disposed at the end faces of the optical waveguide plates 38, the directivity characteristics of the emitted light, and the layout of the light sources. For example, the dot area of a plurality of light scattering layers 80 arrayed vertically along a given column across the three light emission zones $50_1$, $50_2$, $50_3$ can be changed within a range of about ±15%. Specifically, an optimum dot area can be achieved for each of the embodiments. For example, as indicated by the dotted lines E and F in FIG. 23, the dot area may be reduced linearly or stepwise from the upper or lower end toward the central region, or as indicated by the dotted lines I and J in FIG. 23, the dot area may be increased linearly or stepwise from the upper or lower end toward the central region. Alternatively, as indicated by the dotted lines G, H, K, L in FIG. 24, the dot area may be changed nonlinearly. The dot area may further be changed in different patterns in the respective columns in each of the light emission zones.

The illuminating device 10F according to the sixth embodiment is capable of reducing luminance variations depending on the distance from the light sources 90, 92. Planar light emission luminance can thus be made uniform, without being affected by the position or distance from the first and second light sources 90, 92.

For changing the dot area, although only the area of the planar shapes of the light scattering layers 80 may be varied, the size of the actuators 34 should also desirably be varied. This is because increasing the area of the planar shapes of the light scattering layers 80 also results in an increase in the size of the displacement transmitter assembly 39, thereby requiring greater drive forces. Thus, it is preferable to make the actuators 34 greater in size as well.

In the embodiment shown in FIG. 20, the first light source 90 is disposed above the optical waveguide plate 38 and the second light source 92 is disposed beneath the optical waveguide plate 38. However, the first and second light sources 90, 92 may also be arranged in an L shape. Specifically, if the first light source 90 is disposed above the optical waveguide plate 38, then the second light source 92 may be disposed on the left or right side of the optical waveguide plate 38, or if the first light source 90 is disposed beneath the optical waveguide plate 38, then the second light source 92 may be disposed on the left or right side of the optical waveguide plate 38.

The planar shape of the light scattering layers 80, i.e., the shape thereof that is held in contact with the optical waveguide plate 38, may be a circular shape, an elongate rectangular shape, an elliptical shape, a track shape, or any of various polygonal shapes.

In the sixth embodiment described above, the three light emission zones $50_1$, $50_2$, $50_3$ are controlled to emit light at successively shifted times. However, the three light emission zones $50_1$, $50_2$, $50_3$ may also be controlled to emit light simultaneously. According to such a modification, among the light scattering layers 80 disposed throughout all of the light emission zones $50_1$, $50_2$, $50_3$, the dot area of the light scattering layers 80 disposed in positions closest to the first and second light sources 90, 92, for example, may be the smallest, and the dot area of the light scattering layers 80 may be successively reduced as they are positioned more remotely from the first and second light sources 90, 92, in order to equalize the planar light emission luminance.

In the illuminating devices 10A through 10F according to the first through sixth embodiments, the actuators 34 are of the piezoelectric type. However, the actuators 34 may be of an electrostatic type, an electromagnetic type, a thermal type, or a bimetal type.

According to the first through sixth embodiments, the principles of the invention are applied to an illuminating device for use in a display device. However, the principles of the invention are also applicable to various other illuminating devices.

Although certain preferred embodiments of the present invention have been shown and described in detail, it should be understood that various changes and modifications may be made therein without departing from the scope of the appended claims.

What is claimed is:

1. A display device comprising:
   an illuminating device comprising:
      an optical waveguide plate for introducing light thereinto;
      a drive assembly having a planar array of actuators disposed in facing relation to said optical waveguide plate;
      a displacement transmitter assembly disposed between said optical waveguide plate and said drive assembly; and
      a light scattering layer disposed on said displacement transmitter assembly,
   wherein said actuators are selectively displaceable to bring the light scattering layer into and out of contact with said optical waveguide plate, for controlling light that leaks from said optical waveguide plate as emitted light; and
   an optical modulator for modulating the emitted light from said illuminating device to display an image, said optical modulator comprising a liquid crystal panel having a front panel, a rear panel, and a liquid crystal layer sandwiched between said front panel and said rear panel,
   wherein said illuminating device includes a light reflecting layer disposed on an upper portion of said drive assembly which confronts said optical waveguide plate.

2. A display device according to claim 1, further comprising:
   an optical sheet disposed between said illuminating device and said optical modulator.

3. A display device comprising:
   an illuminating device comprising:
      an optical waveguide plate for introducing light thereinto;
      a drive assembly having a planar array of actuators disposed in facing relation to said optical waveguide plate;
      a displacement transmitter assembly disposed between said optical waveguide plate and said drive assembly; and a light scattering layer disposed on said displacement transmitter assembly, wherein said actuators are selectively displaceable to bring the light scattering layer into and out of contact with said optical waveguide plate, for controlling light that leaks from said optical waveguide plate as emitted light; and an optical modulator for modulating the emitted light from said illuminating device to display an image, said optical modulator comprising a liquid crystal panel having a front panel, a rear panel, and a liquid crystal layer sandwiched between said front panel and said rear panel, wherein said illuminating device includes a light reflecting layer disposed on at least a portion of said displacement transmitter assembly which confronts said optical waveguide plate.

4. A display device according to claim 3, wherein said light scattering layer disposed on said displacement transmitter assembly is disposed on said light reflecting layer.

5. A display device according to claim 3, further comprising:

an optical sheet disposed between said illuminating device and said optical modulator.

6. A display device comprising:

an illuminating device comprising:

an optical waveguide plate for introducing light thereinto;

a drive assembly having a planar array of actuators disposed in facing relation to said optical waveguide plate;

a displacement transmitter assembly disposed between said optical waveguide plate and said drive assembly; and a light scattering layer disposed on said displacement transmitter assembly, wherein said actuators are selectively displaceable to bring the light scattering layer into and out of contact with said optical waveguide plate, for controlling light that leaks from said optical waveguide plate as emitted light; and an optical modulator for modulating the emitted light from said illuminating device to display an image, said optical modulator comprising a liquid crystal panel having a front panel, a rear panel, and a liquid crystal layer sandwiched between said front panel and said rear panel, wherein said illuminating device includes a light reflecting layer disposed on at least a portion of said drive assembly which confronts said optical waveguide plate.

7. A display device according to claim 6, further comprising:

a light reflecting layer disposed on at least a portion of said displacement transmitter assembly which confronts said optical waveguide plate, wherein said light scattering layer disposed on said displacement transmitter assembly is disposed on said light reflecting layer.

8. A display device according to claim 6, further comprising:

an optical sheet disposed between said illuminating device and said optical modulator.

9. A display device comprising:

an illuminating device comprising:

an optical waveguide plate for introducing light thereinto;

a drive assembly having a planar array of actuators disposed in facing relation to said optical waveguide plate;

a displacement transmitter assembly disposed between said optical waveguide plate and said drive assembly; and a light scattering layer disposed on said displacement transmitter assembly, wherein said actuators are selectively displaceable to bring the light scattering layer into and out of contact with said optical waveguide plate, for controlling light that leaks from said optical waveguide plate as emitted light; and an optical modulator for modulating the emitted light from said illuminating device to display an image, said optical modulator comprising a liquid clystal panel having a front panel, a rear panel, and a liquid crystal layer sandwiched between said front panel and said rear panel, wherein said illuminating device includes a spacer disposed between said drive assembly and said optical waveguide plate, and a light reflecting layer disposed on at least a portion of said spacer which confronts said optical waveguide plate.

10. A display device according to claim 9, further comprising:

a light reflecting layer disposed on at least a portion of said displacement transmitter assembly which confronts said optical waveguide plate, wherein said light scattering layer disposed on said displacement transmitter assembly is disposed on said light reflecting layer.

11. A display device according to claim 9, further comprising:

an optical sheet disposed between said illuminating device and said optical modulator.

\* \* \* \* \*

UNITED STATES PATENT AND TRADEMARK OFFICE
CERTIFICATE OF CORRECTION

| | | |
|---|---|---|
| PATENT NO. | : 7,444,052 B2 | Page 1 of 1 |
| APPLICATION NO. | : 11/083358 | |
| DATED | : October 28, 2008 | |
| INVENTOR(S) | : Kenichi Iwauchi et al. | |

It is certified that error appears in the above-identified patent and that said Letters Patent is hereby corrected as shown below:

<u>Column 30</u>

*Line 28 Claim 9*: please change "clystal" to --crystal--

Signed and Sealed this

Thirteenth Day of January, 2009

JON W. DUDAS
*Director of the United States Patent and Trademark Office*